(12) United States Patent
Reyes

(10) Patent No.: US 10,554,728 B2
(45) Date of Patent: Feb. 4, 2020

(54) APPROACH FOR SHARING ELECTRONIC DOCUMENTS DURING ELECTRONIC MEETINGS

(71) Applicant: Alex Reyes, Sunnyvale, CA (US)

(72) Inventor: Alex Reyes, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 326 days.

(21) Appl. No.: 14/920,677

(22) Filed: Oct. 22, 2015

(65) Prior Publication Data

US 2017/0118271 A1   Apr. 27, 2017

(51) Int. Cl.
*G06F 15/16* (2006.01)
*H04L 29/08* (2006.01)
(Continued)

(52) U.S. Cl.
CPC ............. *H04L 67/06* (2013.01); *H04L 51/08* (2013.01); *H04L 65/1089* (2013.01); *H04L 65/403* (2013.01)

(58) Field of Classification Search
CPC ..... H04L 67/06; H04L 65/1089; H04L 51/08; H04L 65/403
See application file for complete search history.

(56) References Cited

U.S. PATENT DOCUMENTS 6,289,460 B1   9/2001   Hajmiragha
6,608,636 B1   8/2003   Roseman
(Continued)

FOREIGN PATENT DOCUMENTS

JP   2003-050793   2/2003
JP   2004-295955   10/2004
(Continued)

OTHER PUBLICATIONS

European Patent Office, "Search Report" in application No. 16174777.9-1955, dated Jul. 11, 2016, 7 pages.
(Continued)

*Primary Examiner* — John B Walsh
(74) *Attorney, Agent, or Firm* — Hickman Palermo Becker Bingham LLP; Edward A. Becker

(57) ABSTRACT

An approach is provided for sharing electronic documents during electronic meetings. Client devices of meeting participants are configured with a file sharing application that allows participants of an electronic meeting to request and receive, during the electronic meeting, electronic documents that are displayed during the electronic meeting, allows presenters to review and approve or deny requests for electronic documents, and to apply security restrictions to electronic documents on a participant-by-participant basis. Private electronic meetings may be established concurrent with an existing electronic meeting and include one or more participants from a general electronic meeting from which they were instantiated, and may include other participants that are not participants of the general electronic meeting. Participants may be selected by a meeting organizer and various criteria may be used to select participants. Content shared during a private electronic meeting may be designated as not to be shared during the general electronic meeting.

20 Claims, 11 Drawing Sheets

(51) Int. Cl.
*H04L 12/58* (2006.01)
*H04L 29/06* (2006.01)

(56) References Cited

U.S. PATENT DOCUMENTS

| | | | |
|---|---|---|---|
| 7,007,235 B1* | 2/2006 | Hussein | G06Q 10/10 |
| | | | 715/751 |
| 7,353,252 B1 | 4/2008 | Yang | |
| 7,478,129 B1* | 1/2009 | Chemtob | H04L 12/1827 |
| | | | 709/204 |
| 8,516,050 B1 | 8/2013 | Chapweske | |
| 8,789,094 B1 | 7/2014 | Singh et al. | |
| 8,892,679 B1 | 11/2014 | Destagnol et al. | |
| 8,914,734 B2 | 12/2014 | Narayanaswamy | |
| 8,972,869 B1 | 3/2015 | Willis | |
| 2002/0085029 A1 | 7/2002 | Ghani | |
| 2005/0063365 A1 | 3/2005 | Mathew | |
| 2005/0227216 A1 | 10/2005 | Gupta | |
| 2006/0092863 A1 | 5/2006 | Schmidt | |
| 2007/0208826 A1 | 9/2007 | Devolites | |
| 2008/0107271 A1 | 5/2008 | Mergen | |
| 2008/0222734 A1 | 9/2008 | Redlich | |
| 2008/0229211 A1 | 9/2008 | Herberger | |
| 2008/0294899 A1 | 11/2008 | Gazzetta | |
| 2009/0006982 A1 | 1/2009 | Curtis | |
| 2009/0178144 A1 | 7/2009 | Redlich | |
| 2009/0288147 A1 | 11/2009 | Yeung | |
| 2010/0158254 A1 | 6/2010 | Schaad | |
| 2010/0332401 A1 | 12/2010 | Prahlad | |
| 2011/0264745 A1 | 10/2011 | Ferlitsch | |
| 2012/0221952 A1 | 8/2012 | Chavez | |
| 2012/0221963 A1 | 8/2012 | Motoyama | |
| 2013/0030878 A1 | 1/2013 | Weaver | |
| 2013/0060594 A1 | 3/2013 | Motoyama | |
| 2013/0104194 A1 | 4/2013 | Rago et al. | |
| 2013/0145284 A1 | 6/2013 | Anantharaman | |
| 2013/0339525 A1 | 12/2013 | Tamari | |
| 2014/0101268 A1 | 4/2014 | Borghetti | |
| 2014/0114878 A1 | 4/2014 | Bluth | |
| 2014/0149505 A1 | 5/2014 | Christiansen | |
| 2014/0164761 A1 | 6/2014 | Kufluk | |
| 2014/0215004 A1 | 7/2014 | Daly | |
| 2014/0245185 A1 | 8/2014 | Knodt et al. | |
| 2014/0282013 A1 | 9/2014 | Amijee | |
| 2015/0049163 A1 | 2/2015 | Smurro | |
| 2015/0066556 A1 | 3/2015 | Dominick et al. | |
| 2015/0169069 A1 | 6/2015 | Lo | |
| 2015/0378995 A1 | 12/2015 | Brown | |
| 2016/0070812 A1 | 3/2016 | Murphy | |
| 2016/0344567 A1* | 11/2016 | Navale | H04L 12/1822 |
| 2016/0373387 A1 | 12/2016 | Reyes et al. | |
| 2016/0373516 A1 | 12/2016 | Reyes et al. | |

FOREIGN PATENT DOCUMENTS

| | | |
|---|---|---|
| JP | 2006-140790 | 6/2006 |
| JP | 2006-251977 | 9/2006 |
| JP | 2007-213467 | 8/2007 |
| JP | 2010-182074 | 8/2010 |
| JP | 2013-140549 | 1/2015 |
| WO | WO 2014/197819 A2 | 12/2014 |

OTHER PUBLICATIONS

Microsoft Computer Dictionary, dated May 1, 2002, Microsoft Press, 5th edition, 3 pages.

Reyes, U.S. Appl. No. 14/746,466, filed Jun. 22, 2015, Office Action, dated Mar. 30, 2018.

Reyes, U.S. Appl. No. 14/746,466, filed Jun. 22, 2015, Advisory Action, dated Nov. 26, 2018.

Reyes, U.S. Appl. No. 14/746,175, filed Jun. 22, 2015, Advisory Action, dated Dec. 27, 2018.

Reyes, U.S. Appl. No. 14/746,466, filed Jun. 22, 2015, Notice of Allowance, dated Jul. 17, 2019.

Reyes, U.S. Appl. No. 14/746,466, filed Jun. 22, 2015, Interview Summary, dated Jun. 3, 2019.

* cited by examiner

FIG. 2B

Participant A — Requested Documents Screen 250

| Meeting Name/ID | Document Name | Presenter Name | Request Status | Security Restrictions |
|---|---|---|---|---|
| Meeting #1 | Document A | Participant B. | Pending | n/a |
| Meeting #1 | Document B | Bob H. | Granted | Level 1 (No Restrictions) |
| Meeting #1 | Document C | Judy P. | Granted | Level 2 (Security Code) |
| Meeting #2 | Document D | Sarah U. | Granted | Level 3 (Enhanced Security) |
| Meeting #2 | Document E | Adam T. | Denied | n/a |

FIG. 2C

Participant B — Shared Documents Screen 270

| Meeting Name/ID | Document Name | Requestor Name | Request Status | Security Restrictions |
|---|---|---|---|---|
| Meeting #1 | Document A | Participant A. | Pending | Deny, Level 1; Level 2; Level 3 |
| Meeting #1 | Document A | Participant C | Pending | Deny, Level 1; Level 2; Level 3 |
| Meeting #1 | Document A | Participant D | Granted | Level 3 (Enhanced Security) |
| Meeting #2 | Document F | Participant D. | Granted | Level 2 (Security Code) |
| Meeting #5 | Document G | Participant F | Granted | Level 1 (No Restrictions) |
| Meeting #3 | Document H | Participant X | Denied | n/a |
| Meeting #2 | Document I | Participant Y | Denied | n/a |

FIG. 4A

Electronic Meeting Document Tracking Data 400

| Meeting Name/ID | Document Name | Meeting Participants |
|---|---|---|
| Meeting #1 | Document A | Participant A, Participant B, Participant C |
| Meeting #1 | Document B | Participant A, Participant B, Participant C |
| Meeting #1 | Document C | Participant A, Participant B |
| Meeting #2 | Document D | Participant A, Participant D |
| Meeting #2 | Document E | Participant A, Participant E |

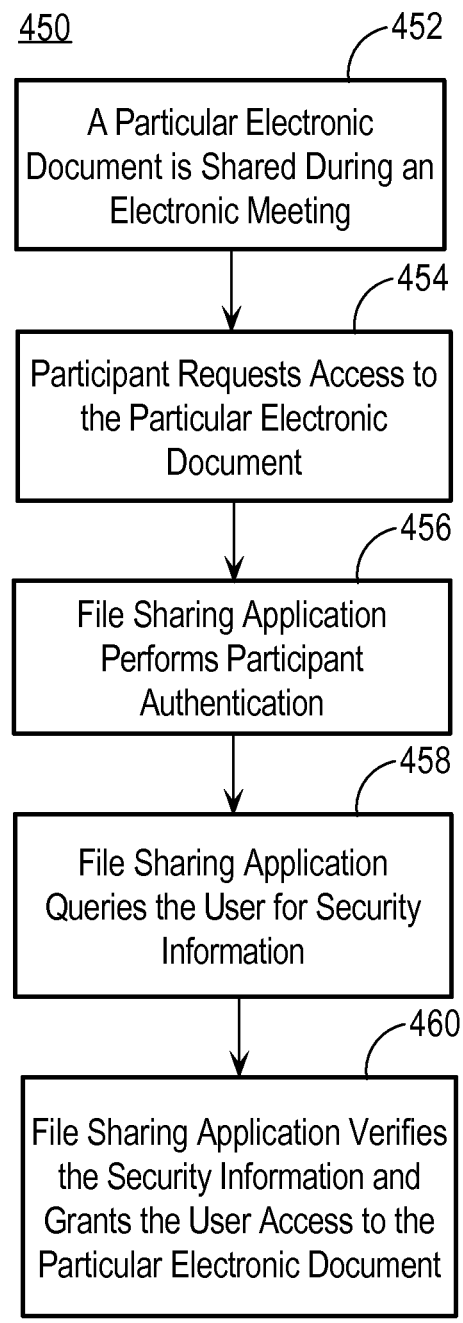

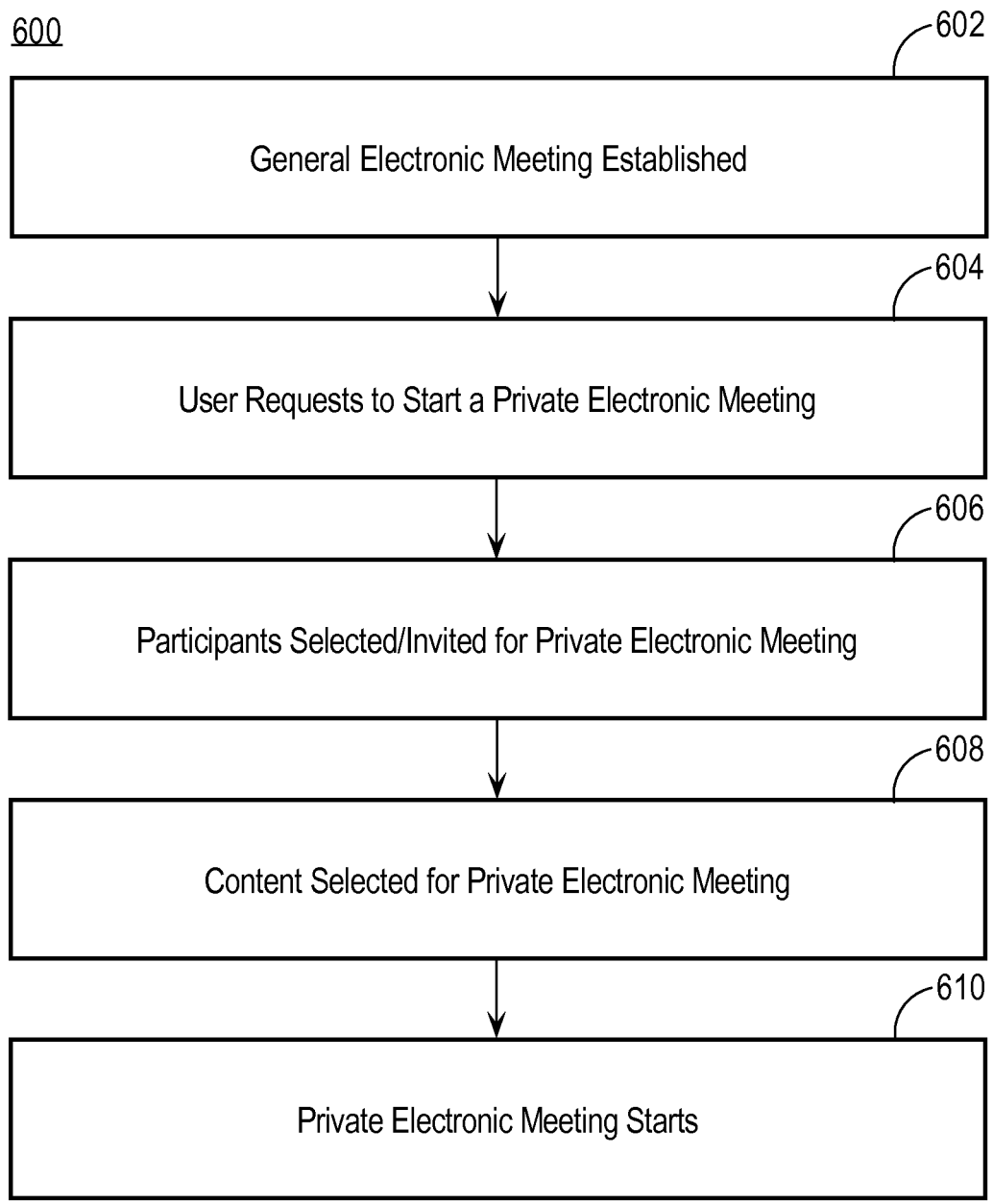

APPROACH FOR SHARING ELECTRONIC DOCUMENTS DURING ELECTRONIC MEETINGS

RELATED APPLICATION DATA AND CLAIM OF PRIORITY

This application is related to U.S. patent application Ser. No. 14/746,175 entitled APPROACH FOR SHARING ELECTRONIC DOCUMENTS DURING ELECTRONIC MEETINGS, filed Jun. 22, 2015 and U.S. patent application Ser. No. 14/746,466 entitled APPROACH FOR SHARING ELECTRONIC DOCUMENTS DURING ELECTRONIC MEETINGS, filed Jun. 22, 2015, the contents all of which are incorporated by reference in their entirety for all purposes as if fully set forth herein.

FIELD OF THE INVENTION

Embodiments relate generally to electronic meetings and file sharing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A variety of collaboration tools now exists for conducting electronic meetings over networks. These tools allow meeting participants, in geographically disparate locations, to simultaneously view electronic documents, share computer desktops and conduct video conferencing. One of the issues with these tools, however, is that meeting participants interested in a copy of an electronic document viewed during an electronic meeting must separately request the electronic document from the meeting organizer or the participant who presented the electronic document. The electronic document has to then be separately provided to the requestor, typically via email. Another issue is that electronic documents are often provided to requestors without any security restrictions, which allows unauthorized access to or use of the electronic documents by third parties.

SUMMARY

An apparatus includes one or more processors, one or more memories communicatively coupled to the one or more processors, a display, and collaboration client executing on the apparatus and configured to support an electronic meeting via one or more networks with another apparatus that is external to the apparatus. The collaboration client is configured to cause to be displayed on the display of the apparatus, one or more graphical user interface objects that allow a user of the apparatus to request creation of a private electronic meeting to be conducted concurrently with an existing electronic meeting. The private electronic meeting includes a subset of participants from a plurality of participants of the existing electronic meeting and allows for the sharing of information between participants in the subset of participants from the plurality of participants of the existing electronic meeting. The collaboration client is further configured to detect a user selection of the one or more graphical user interface objects that allow a user of the apparatus to request creation of a private electronic meeting to be conducted concurrently with the existing electronic meeting and cause creation of the private electronic meeting to be conducted concurrently with the existing electronic meeting.

BRIEF DESCRIPTION OF THE DRAWINGS

In the figures of the accompanying drawings like reference numerals refer to similar elements.

FIG. 2B depicts an example requested documents screen.

FIG. 2C depicts an example shared documents screen.

FIG. 4A depicts example electronic meeting tracking data.

FIG. 4B is a flow diagram that depicts an approach for using participant authentication to manage access to electronic documents shared during an electronic meeting.

FIG. 6 is a flow diagram that depicts an approach for sharing information using private meetings.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
   A. Client Devices
   B. Collaboration Server
III. SHARING ELECTRONIC DOCUMENTS DURING ELECTRONIC MEETINGS
   A. Requesting Electronic Documents
   B. Processing Requests for Electronic Documents
   C. Participant Authentication
IV. PRIVATE ELECTRONIC MEETINGS
   A. Overview
   B. Establishing Private Electronic Meetings
   C. Private Electronic Meeting Participants
   D. Adding Content to Private Electronic Meetings
V. IMPLEMENTATION MECHANISMS I. Overview An approach is provided for sharing electronic documents during electronic meetings. Client devices of meeting participants are configured with a file sharing application that allows participants of an electronic meeting to request and receive, during the electronic meeting, electronic documents that are displayed during the electronic meeting. The file sharing application allows presenters to review and approve or deny requests for electronic documents, and to apply security restrictions to electronic documents on a participant-by-participant basis. Security restrictions may also be specific to particular electronic meetings and access to electronic documents shared during electronic meetings may be restricted to users who were participants of the electronic meetings. The approach provides a user-friendly approach for both presenters and participants to share electronic documents on-demand during electronic meetings. Although embodiments are described herein in the context of sharing files, embodiments are not limited to files per se and are applicable to sharing any type of data in any format or structure. Embodiments include a capability is provided to establish one or more private electronic meetings to be conducted concurrent with an existing electronic meeting. Private electronic meetings include one or more participants from a general electronic meeting from which they were instantiated, and may include other participants that are not participants of the general electronic meeting. Participants may be selected by a meeting organizer and various criteria may be used to select participants. Content shared during a private electronic meeting may be designated as not to be shared during the general electronic meeting from which the private electronic meeting was instantiated.

II. System Architecture

Figure 1:
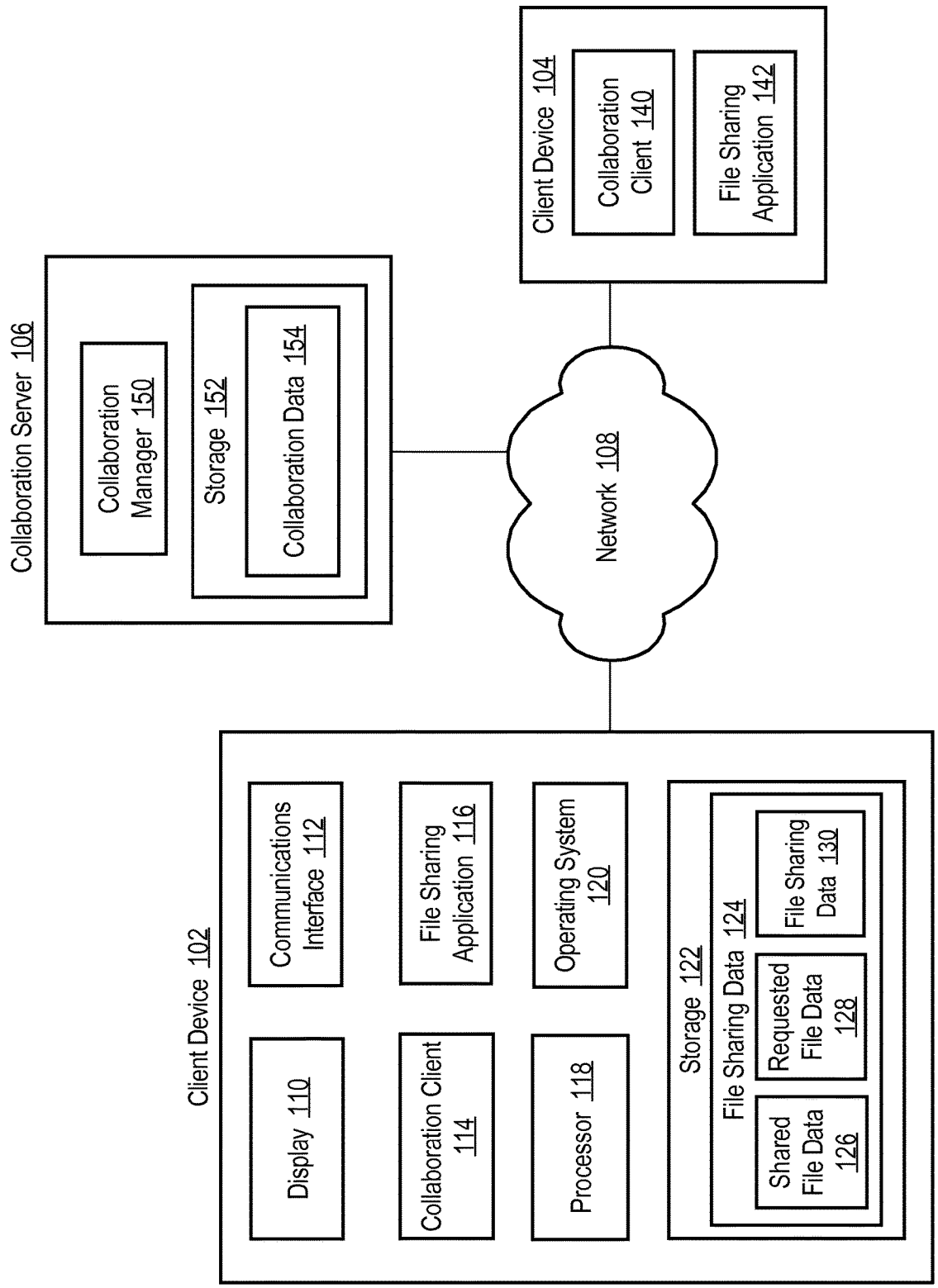
FIG. 1 is a block diagram that depicts an arrangement for sharing electronic documents during electronic meetings.

FIG. 1 is a block diagram that depicts an arrangement 100 for sharing electronic documents during electronic meetings. Arrangement 100 includes client devices 102, 104 and a collaboration server 106, communicatively coupled via a network 108. Arrangement 100 is not limited the particular elements depicted in FIG. 1 and may include fewer or additional elements depending upon a particular implementation. Network 108 is depicted in FIG. 1 as a single network for purposes of explanation only and network 108 may include any number and types of wired or wireless networks, such as local area networks (LANs), wide area networks (WANs), the Internet, etc. The various elements depicted in FIG. 1 may also communicate with each other via direct communications links that are not depicted in FIG. 1 for purposes of explanation.

A. Client Devices

Client devices 102, 104 may be any type of client device that is capable of participating in an electronic meeting. Example implementations of client devices 102, 104 include, without limitation, a workstation, personal computer, laptop computer, tablet computing device, personal digital assistant, smart phone, an interactive whiteboard appliance, etc. In the example depicted in FIG. 1, client device 102 is depicted with various components that may also be included in client device 104, but these components are depicted in the figures and described only with respect to client device 102 for purposes of explanation.

In the example depicted in FIG. 1, client device 102 includes a display 110, a communications interface 112, a collaboration client 114, a file sharing application 116, a processor 118, an operating system (OS) 120, and storage 122. These elements are described in more detail hereinafter. Client device 102 may include fewer or more components that those depicted in FIG. 1 and described herein and the particular components used may vary depending upon a particular implementation and client device 102 is not limited to a particular set of components or features. For example, client device 102 may also include manual controls, such as buttons, slides, etc., not depicted in FIG. 1, for performing various functions on mobile device, such as powering on/off or changing the state of client device 102 and/or display 110.

Display 110 may be implemented by any type of display that displays images and information to a user and may also be able to receive user input and embodiments are not limited to any particular implementation of display 110. As one non-limiting example, display 110 may be a touchscreen display 110 that both displays information to users and allows user to select graphical user interface objects. Client device 102 may have any number of displays 120, of similar or varying types, located anywhere on client device 102.

Communications interface 112 may include computer hardware, software, or any combination of computer hardware and software to provide wired and/or wireless communications between client device 102 and other devices and/or networks, such as collaboration server 106 and client device 104. The particular components for communications interface 112 may vary depending upon a particular implementation and embodiments are not limited to any particular implementation of communications interface 112.

Collaboration client 114 is an application that executes on client device 102 and, in conjunction with collaboration server 106, supports electronic meetings between client device 102 and other devices, such as client device 104. One non-limiting example implementation of collaboration client 114 is a Microsoft Lync Client. Client device 104 also includes a collaboration client 140 that may include the same functionality as collaboration client 114.

File sharing application 116 is an application that executes on client device 102 and allows electronic meeting participants to request and receive, during the electronic meeting, electronic documents that are displayed during the electronic meeting. File sharing application 116 allows presenters to review and approve or deny requests, and to apply security restrictions to electronic documents on a participant-by-participant basis. File sharing application 116 may maintain information about past, present and future electronic meetings, including the meeting participants and their status, as well as requests for electronic documents, the status of requests, and electronic documents that have been shared. File sharing application 116 may be implemented in computer hardware, computer software, or any combination of computer hardware and computer software. File sharing application 116 may be implemented as a stand-alone entity, as depicted in FIG. 1 for purposes of explanation only, or implemented as part of one or more other entities. For example, file sharing application 116 may be implemented as part of collaboration client 114 or as a plug-in to collaboration client 114. File sharing application 116 may display, in conjunction with collaboration client 114 and other components on client device 102, such as a UI component (not displayed in FIG. 1), and OS 120, various graphical user interface controls for sharing electronic documents displayed during an electronic meeting. Client device 104 also includes a file sharing application 142 that may include the same functionality as file sharing application 116.

Operating system 120 executes on client device 102 and may be any type of operating system that may vary depending upon a particular implementation and embodiments are not limited to any particular implementation of operating system 120. Operating system 120 may include multiple operating systems of varying types, depending upon a particular implementation. Processor 118 may be any number and types of processors and storage 122 may be implemented by any number and types of memories, including volatile memory and non-volatile memory, which may vary depending upon a particular implementation.

In the example depicted in FIG. 1, storage 122 stores file sharing data 124 that includes shared file data 126, requested file data 128 and file sharing data 130. Shared file data 126 indicates data, such as one or more electronic documents, that have been requested by other participants of an electronic meeting. Shared file data 126 may specify, for example, requests for data, the status of those requests, e.g., granted or denied, timestamp data that indicates when and by whom data was requested and security restrictions applied to data for which a request has been granted, which may be on a participant-by-participant basis. Shared file data 126 may also include the actual data that has been shared with other participants. Shared file data 126 may be specific to a particular user, for example a particular user of client device 102, or may be specific to multiple users.

Requested file data 128 is data that indicates data, such as one or more electronic documents, that have been requested by a participant of an electronic meeting, such as a user of client device 102. Requested file data 128 may specify, for example, requests for data, the status of those requests, e.g., granted or denied, timestamp data that indicates when and by whom data was requested, the owner and/or location of the data, and security restrictions applied to data for which a request has been granted, which may be on a participant-by-participant basis. Requested file data 128 may also include the actual data that has been requested and granted by other participants. Requested file data 128 may be specific to a particular user, for example a particular user of client device 102, or may be specific to multiple users.

File sharing data 130 may be used by file sharing application 116 and specify, for example, the participants of an electronic meeting and the status of the participants, for example, whether the participants are presenters or participants.

Although depicted in FIG. 1 as separate data for purposes of explanation, shared file data 126, requested file data 128 and file sharing data 130 may be combined in any manner and stored in any format or according to any type of data structure that may vary depending upon a particular implementation.

B. Collaboration Server

Collaboration server 106 manages electronic meetings conducted between devices, such as client devices 102, 104. In the example depicted in FIG. 1, collaboration server includes a collaboration manager 150 and storage 152 that stores collaboration data 154. Collaboration manager 150 may interact with collaboration clients on client devices 102, 104 to manage electronic meetings. The electronic meetings may include document sharing, desktop sharing, videoconferencing, etc. Collaboration data 154 may include data for supporting and managing electronic meetings, for example, data that indicates information about the electronic meeting itself, participants, content shared during the electronic meeting, etc. One non-limiting example implementation of collaboration manager 150 is a Microsoft Lync Server. Storage 152 may be implemented by any number and types of memories, including volatile memory and non-volatile memory, which may vary depending upon a particular implementation. Collaboration server 106 may include various other components that may vary depending upon a particular implementation and collaboration server 106 is not limited to a particular set of components or features. The use of a collaboration server 106 is optional and embodiments are applicable to electronic meeting systems that do not use a collaboration server, for example, peer-to-peer collaboration systems.

III. Sharing Electronic Documents During Electronic Meetings

Figure 2A:
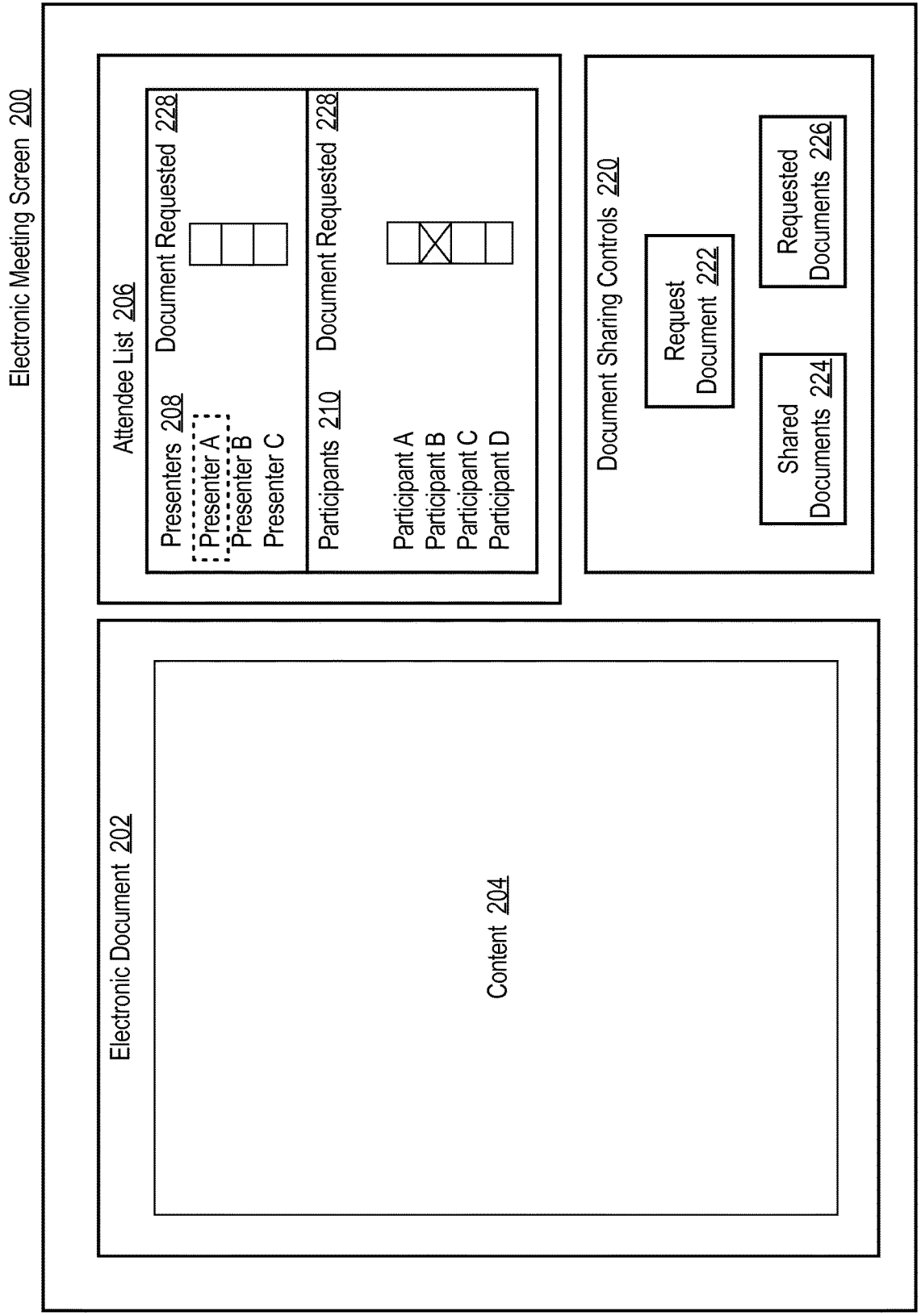
FIG. 2A depicts an example electronic meeting screen.

FIG. 2A depicts an example electronic meeting screen 200 generated, for example, by collaboration client 114 and file sharing application 116. Thus, each participant in an electronic meeting may have their own electronic meeting screen 200. Electronic meeting screen 200 includes an electronic document 202 having content 204 that is currently being displayed during an electronic meeting. Examples of electronic document 202 include, without limitation, slide show presentations, word processing documents, images, videos, etc. Electronic meeting screen 200 may include graphical user interface controls for manipulating electronic document 202 and/or content 206 that are not depicted in FIG. 2A and described herein for purposes of explanation. As one example, such controls may allow minimizing and maximizing the display of electronic document 202 and content 206, and for taking control of an electronic meeting or giving control of an electronic meeting to another participant. Embodiments are applicable to dynamic meetings in which any participant may be a presenter or attendee at any time. Accordingly, electronic meeting screen 200 may include controls that allow a user to designate themselves as a presenter or attendee, and/or to switch between being a presenter and an attendee. The controls presented to a presenter/attendee may be specific to the presenter/attendee's current role. For example, a participant who is currently a presenter may have a different set of electronic meeting controls than a participant who is currently an attendee, and those controls may vary depending upon a particular implementation.

Electronic meeting screen 200 includes an attendee list 206 that identifies participants in the electronic meeting. The participants are separately identified as presenters 208 and participants 210. Presenters 208 are participants who have previously or are currently presenting information to the other participants and participants 210 are non-presenter participants who are participating in the electronic meeting, and may be requesting information from other participants, but are not presenting information to other participants. In the example depicted in FIG. 2A, presenters 208 include three presenters identified as Presenter A, Presenter B, Presenter C and Presenter D and the dashed rectangle visually indicates that Presenter A is currently presenting electronic document 202. Participants 210 include four participants identified as Participant A, Participant B, Participant C and Participant D. Additional controls may be provided, for example, to collapse and expand the presenters 208 and participants 210 lists, which may be useful when the number of presenters 208 and/or participants 210 is large.

Electronic meeting screen 200 includes document sharing controls 220 generated by file sharing application 116. Document sharing controls 220 may be represented by any type and number of graphical user interface objects that may vary depending upon a particular implementation and embodiments are not limited to the examples depicted in FIG. 2A and described herein. According to one embodiment, document controls 220 include controls request document 222, shared documents 224 and requested documents 226. The request document 222 control is used by a participant to request the electronic document 202 that is currently being displayed during the electronic meeting. The shared documents 224 control is used by a particular participant to view a list of electronic documents displayed during the electronic meeting to which the particular participant has granted access to other participants. The requested documents 226 control is used by a particular participant to view a list of electronic documents displayed during the electronic meeting that the particular participant has requested. Document requested 228 controls visually depict which of the current presenters and participants have requested the electronic document 202 currently being displayed. Document requested controls 228 are depicted in FIG. 2A as selectable boxes for purposes of explanation, but embodiments are not limited to the example depicted in FIG. 2A. For example, graphical symbols may be displayed to indicate that an electronic document has been requested by a participant. Attributes of the graphical symbols may be changed to visually indicate a change in status. For example, different colors, sizes and other attributes such as blinking, etc., may be used to indicate current status, order and priority of requests for electronic documents. Controls, such as request document 222, shared documents 224 and requested documents 226 may be displayed in a different manner depending upon the role of a participant. For example, if a particular participant is currently an attendee and has never been a presenter in the existing electronic meeting, then the shared documents 224 control may not be made available until the particular participant's role is changed from an attendee to a presenter.

A. Requesting Electronic Documents

A user of client device 102 requests a currently-displayed electronic document, such as electronic document 202, by selecting the request document 222 control. In response to selecting the request document 222 control, file sharing application 116 generates and transmits a request for electronic document 202 to the presenter of electronic document 202. This may include file sharing application 116 transmitting the request for electronic document 202 to the file sharing application executing on the computing device of the presenter of electronic document 202. File sharing application 116 may consult file sharing data 130 to determine the presenter of electronic document 202. Alternatively, file sharing application 116 may generate and transmit a request to collaboration server 106 and/or one or more of the participants of the electronic meeting to determine the presenter of electronic document 202. As described in more detail hereinafter, the presenter of the electronic document 202 is notified of the request for the electronic document and is able to reject or accept the request, and also apply one or more security restrictions to the electronic document 202. The file sharing application on the computing device of the requestor then generates and transmits a response to the request to file sharing application 116 of the requestor.

File sharing application 116 receives the response to the request and updates requested file data 128 based upon the response. For example, file sharing application 116 may update requested file data 128 to indicate that a request was made for electronic document 202, whether the request was granted or denied, timestamp data that indicates when and by whom data was requested, the owner and/or location of the data, and security restrictions applied to data for which a request has been granted. The response to the request may also include the electronic document 202 or alternatively, file sharing application 116 may separately request electronic document 202 once the request is granted. File sharing application 116 may then store the received electronic document 202, for example, on storage 122. This may be accomplished by file sharing application 116 accessing one or more functions provided by OS 120 and may include display of a dialog box to give the user an option to specify the location where the electronic document 202 is to be stored. Alternatively, the electronic document 202 may be stored in a default or previously specified location on storage 202. This process may be performed easily and quickly by the user simply selecting the request document 222 control. This eliminates the need for the user to separately contact and acquire the electronic documents 202 from the presenter, for example via email, which is particularly convenient when the user does not have current contact information for the presenter.

A user may also view information about documents that the user has selected by selecting the requested documents 226 control. FIG. 2B depicts an example requested documents screen 250 for Participant A that provides information about requests made by Participant A for electronic documents displayed during electronic meetings. Requested documents screen 250 may be generated by file sharing application 116 in response to the user selection of the requested documents 226 control. The electronic documents may have been requested during a single or multiple electronic meetings. Requested documents screen 250 depicts information for five documents, identified as Document A-Document E, requested by the user. The information includes a meeting name/ID, a document name, a presenter name, a request status and security restrictions. The information depicted in FIG. 2B is example information and additional or less information may be used, depending upon a particular implementation. The request status indicates whether the request is pending, has been granted, or has been denied. The security restrictions may be not applicable (n/a) for pending and denied requests. In the example depicted in FIG. 2B, three levels of restrictions are available, identified as Level 1 (No restrictions), Level 2 (Security Code) and Level 3 (Enhanced Security). The Level 2 (Security Code) and Level 3 (Enhanced Security) security restrictions indicate that one or more security restrictions have been applied to the requested electronic document to control access to and/or processing of the electronic document. The Level 2 (Security Code) security restriction requires that the security code be provided by the participant to open and/or process the electronic document. The security code may be specified by a presenter after the presenter specifies that Level 2 (Security Code) security The security code may be included with the electronic document or provided separate from the electronic document. For example, a separate message with the security code may be automatically generated and transmitted to the requestor. Alternatively, the electronic document may be encrypted with the security code.

The Level 3 (Enhanced Security) security restriction provides relatively stronger access control than the Level 2 (Security Code) security restriction. For example, the electronic document may be encrypted with an encryption key and stronger encryption may be used compared to the Level 2 (Security Code) security restriction. As another example, Level 3 (Enhanced Security) security restrictions may require user authentication to access an electronic document. User authentication may be enforced at a client device or other types of end user devices, such as printers, MFPs, etc. User authentication may be performed using a wide variety of approaches, such as via an authentication card reader, alpha-numeric code, etc., and then validated locally at a device or remotely, for example, using a lightweight directory access protocol (LDAP) server. Once authentication is successfully completed, a user may be allowed to access and/or process an electronic document.

Thus, the security restrictions may represent a hierarchy of security restrictions that may be applied to requested electronic documents. The security restrictions depicted in FIG. 2B are examples only and the particular security restrictions used may vary, depending upon a particular implementation. While the security restrictions are depicted in FIG. 2B by textual descriptions, embodiments are not limited to this example and graphical representations and/or symbols may be used to depict security restrictions specified for requested electronic documents. For example, symbols having different visual attributes, such as shape, size, color, etc., may be used in place of, or in addition to, the textual descriptions. This approach allows a participant to quickly and easily determine the status of their requests for electronic documents displayed during an electronic meeting.

Figure 3A:
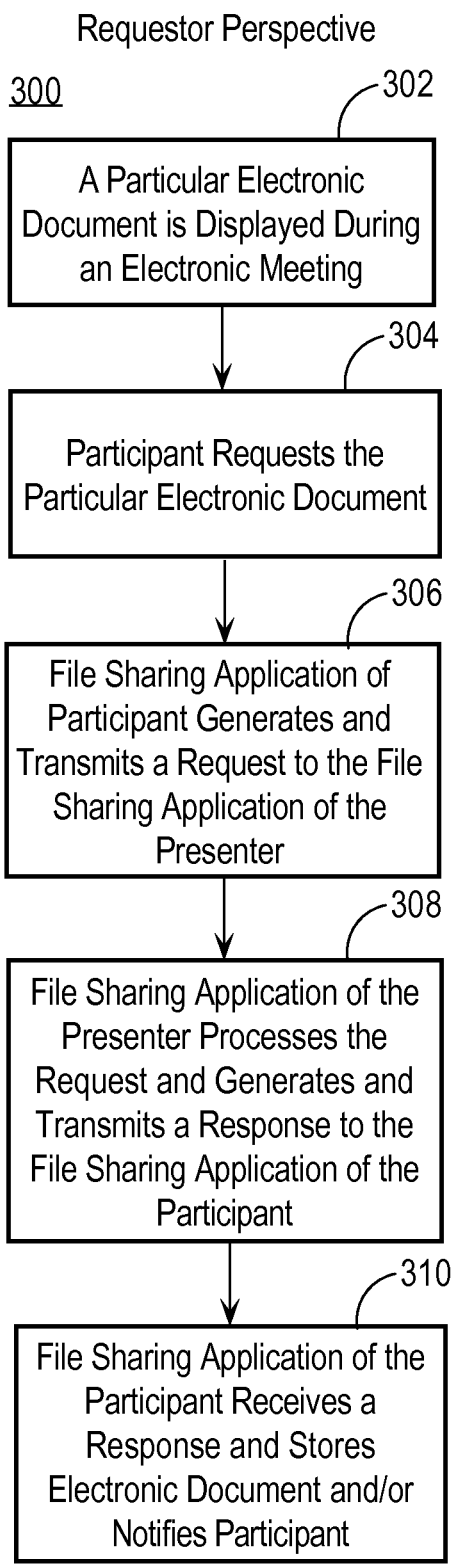
FIG. 3A is a flow diagram that depicts an approach for a sharing electronic documents during an electronic meeting from the perspective of a participant.

FIG. 3A is a flow diagram 300 that depicts an approach for a sharing electronic documents during an electronic meeting from the perspective of a participant. In step 302, a particular electronic document is displayed during an electronic meeting. For example, a user of client device 102 chooses to participant in an electronic meeting with a user of client device 104 who is presenting the particular electronic document. In this example, the user of client device 102 is considered to be a participant and the user of client device 104 is considered to be the presenter. The electronic meeting may be established using the collaboration clients 114, 140 and optionally collaboration manager 150. The particular electronic document may be displayed using the electronic meeting screen 200, including the document sharing controls 220, as previously described herein.

In step 304, the participant wishes to obtain the particular document and requests the particular electronic document. For example, the participant may request the particular electronic document by selecting the request document 222 control.

In step 306, the file sharing application 116 on client device 102 generates and transmits a request for the particular electronic document to file sharing application 142. The request includes data that identifies the particular electronic document and the requestor, i.e., the user of client device 102. File sharing application 116 may obtain data that identifies the particular electronic document currently being displayed from collaboration client 114, collaboration manager 150 or from collaboration client 140, depending upon a particular implementation. For example, collaboration client 114 may include an API with a function that can be invoked by file sharing application 116 to obtain data that identifies the particular electronic document currently being displayed. The request may include additional data, be in any format supported by file sharing applications 116, 142 and may be encrypted, depending upon a particular application. File sharing application 116 also updates file sharing data 130 to include the request so that electronic meeting screen 200 will indicate that the participant has requested the particular electronic document. In the present example, file sharing application 142 will be notified by the request that the participant has requested the particular electronic document. In situations where additional participants are participating in the electronic meeting, file sharing application 116 may also notify the respective file sharing applications of the other participants that the participant has requested the particular electronic document so that their respective electronic meeting screens 200 will indicate that the participant has requested the particular electronic document.

In step 308, the file sharing application of the presenter, i.e., file sharing application 142, receives and processes the request, and generates and transmits a response to file sharing application. The response may specify whether the request was denied or granted and if granted, may include either the particular electronic document or information, such as a link or reference, which provides access to the particular electronic document. For example, the response may include a link to the particular electronic document stored on client device 104 or on a cloud server. In situations where additional participants are participating in the electronic meeting, file sharing application 142 may also notify the respective file sharing applications of the other participants to indicate whether that the participant has requested the particular electronic document so that their respective electronic meeting screens 200 will indicate that the participant has requested the particular electronic document.

In step 310, file sharing application 116 receives and processes the response from file sharing application 142. If the response indicates that the request was granted, file sharing application 116 retrieves and stores the particular electronic document, for example, on storage 122. File sharing application 116 also updates file sharing data 130 to indicate the current status of the request so that the requested documents screen 250 will indicate the current status of the participant's request for the particular electronic document. Any security restrictions applied to the particular electronic document by the presenter are subsequently enforced when the particular electronic document is accessed or processed. For example, security restrictions may be applied when an attempt is made to open the particular electronic document, and/or process the particular electronic document using applications, email, or at a printer multi-function peripheral (MFP), etc. Application of the security restrictions may require, for example, that a user enter a security code or be authenticated prior to accessing or processing the particular electronic document. For example, if Level 2 (Security Code) security restrictions were applied to the particular electronic document, the user may be required to enter the security code specified by the presenter to open the particular electronic document in an application program, such as a word processing program or a pdf viewer, or to print the particular electronic document at a printer or MFP.

B. Processing Requests for Electronic Documents

A user of client device 102 processes requests for electronic documents, such as electronic document 202, by selecting the shared documents 224 control. In response to selecting the request document 222 control, file sharing application 116 provides one or more graphical user interface controls that allow a user to display and manage requests for one or more electronic documents presented by the user during one or more electronic meetings. FIG. 2C depicts an example shared documents screen 270 for Participant B that provides information about requests for electronic documents presented by Participant B during electronic meetings. Shared documents screen 270 is displayed by the file sharing application executing on the computing device of Participant B.

Shared documents screen 270 may be generated by file sharing application 116 in response to the user selection of the shared documents 224 control. The electronic documents may have been requested during a single or multiple electronic meetings. Shared documents screen 270 depicts information for seven requests for electronic documents, including three requests for Document A and a single request for each of Document F, Document G, Document H and Document I. The information for the requests includes a meeting name/ID, a document name, a requestor name, a request status and security restrictions. The information depicted in FIG. 2C is example information and additional or less information may be used, depending upon a particular implementation. The request status indicates whether the request is pending, has been granted, or has been denied. The security restrictions are not applicable (n/a) for pending and denied requests.

In the example depicted in FIG. 2C, the security restrictions include controls for denying a request or applying a security restriction level to a request, which implicitly includes accepting a request. Any of the content in shared documents screen 270 may be active and selectable by a user. For example, a user may use a selection mechanism, such as a computer mouse, to select one of the columns, such as Meeting Name/ID to cause the information in shared documents screen 270 to be sorted by the selected column. In addition, data within shared documents screen 270 may be selected by a user. For example, Participant B may use a selection device, such as a computer mouse, to select "Deny" and the request from Participant A for Document A is denied. As another example, Participant B may select "Level 1" and the request from Participant A for Document A is accepted with Level 1 security restrictions applied for Document A with respect to Participant A. Each request is specific to a particular requestor and granting a request with a particular security restriction is specific to the particular requestor and different security restrictions (or no security restrictions) may be applied to different requests, even for the same electronic document. According to one embodiment, graphical user interface objects, such as symbols and icons may be used in place of, or in addition to, the text depicted in shared documents screen 270 for denying or granting requests and for applying security restrictions. For example, symbols may be displayed that correspond to the actions of denying a request, accepting and applying Level 1, Level 2 or Level 3 security restrictions to provide a more user friendly experience for the presenter of the electronic document. A security restriction (or no security) may be specified as a default. For example, all electronic documents may have a default restriction requirement of "deny" in high security environments, making them non-sharable unless the presenter overrides the default security restriction.

Multiple requests may be made for the same electronic document. For example, it is not uncommon for several participants of an electronic meeting to request the same electronic document that is being displayed. As depicted in FIG. 2C, three requests have been made for Document A by Participant A, Participant C and Participant D. The request from Participant D has been granted with Level 3 (Enhanced Security) and the requests from Participant A and Participant C are currently pending. Alternatively, shared documents screen 270 may include a single entry (row) for each electronic document and provide a visual indication that multiple requests are associated with a particular electronic document. For example, a user-selectable graphic, symbol or icon may be displayed to indicate that multiple requests exist for a particular electronic document. As another example, one or more visual attributes, such as color, bolding, underlining, etc., may be changed for the row in shared documents screen 270 for the particular document to visually indicate that multiple requests exist for the particular electronic document. In response to a user selection of the graphic, symbol or icon, or of any content in the row itself, the row may be expanded into multiple rows to show all of the requests for the particular electronic document. Alternatively, multiple requests for a particular electronic document may be displayed in a dialog box or other graphical user interface objects.

Figure 3B:
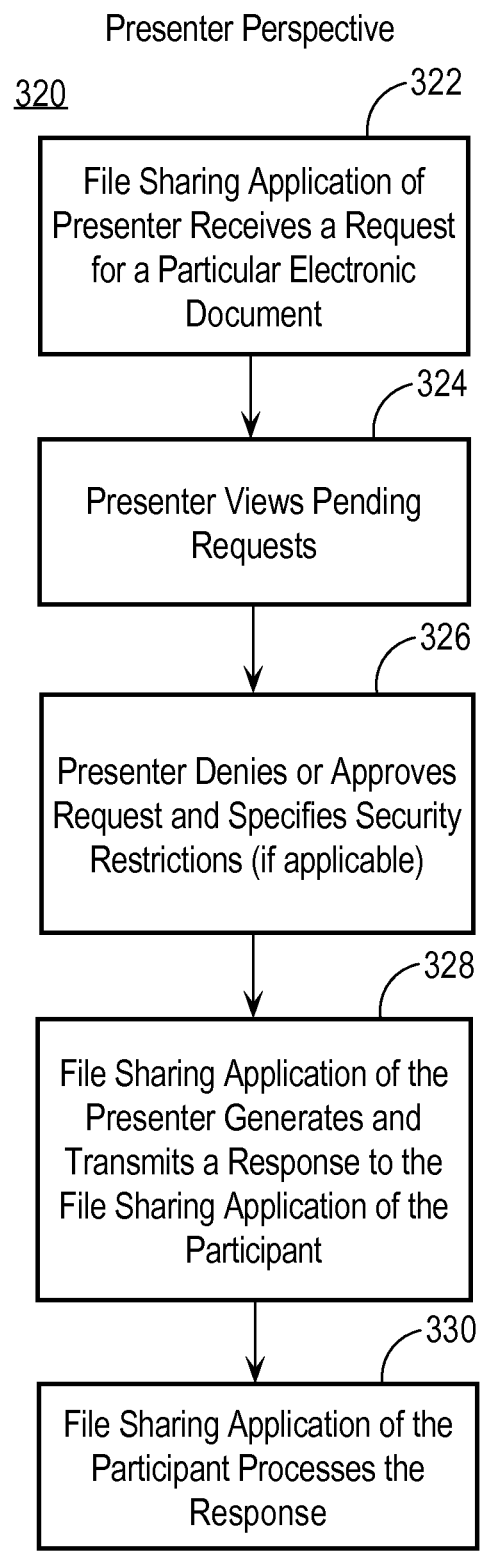
FIG. 3B is a flow diagram that depicts an approach for a sharing electronic documents during an electronic meeting from the perspective of a presenter.

FIG. 3B is a flow diagram 320 that depicts an approach for a sharing electronic documents during an electronic meeting from the perspective of a presenter. In step 322, a file sharing application of a presenter receives a request for a particular electronic document. The particular electronic document is displayed during a existing electronic meeting or may have been displayed during a prior electronic meeting that has now concluded. The file sharing application of the presenter, for example, file sharing application 142, updates file sharing data for the presenter to include the request.

In step 324, the presenter views their pending requests, for example, by selecting shared documents 224 control. The presenters file sharing application detects selection of the shared documents 224 control and displays the shared documents screen 270 to show the requests for the presenter.

In step 326, the presenter denies or approves the request and optionally specifies security restrictions to be applied to the electronic document, as previously described herein. If the presenter specifies that security restrictions are to be applied to the electronic document, then the presenter may be queried for additional information or may select one or more options associated with applying security restrictions. For example, the presenter may be queried to enter a security code for the electronic document. The security code may be an alphanumeric sequence of any length and may have minimum requirements, such as a minimum number of alphanumeric characters. Alternatively, the presenter may select a graphical user interface control to automatically generate a random security code. The security code may be carried with the electronic document or the electronic document may be encrypted with the security code.

In step 328, the file sharing application of the presenter generates and transmits a response to the file sharing application of the participant that made the request. For example, file sharing application 142 on client device 104 may generate and transmit a response to file sharing application 116 on client device 102. The response may specify whether the request was denied or granted and if granted, may include either the particular electronic document or information, such as a link or reference, which provides access to the particular electronic document. For example, the response may include a link to the particular electronic document stored on client device 104 or on a cloud server. In situations where additional participants are participating in the electronic meeting, file sharing application 142 may also notify the respective file sharing applications of the other participants to indicate whether that the participant has requested the particular electronic document so that their respective electronic meeting screens 200 will indicate that the participant has requested the particular electronic document. Security restrictions that were specified by the presenter when granting the request may be applied to the particular electronic document in a wide variety of ways that may vary depending upon a particular implementation. For example, if Level 2 (Security Code) security restrictions were specified, the security code specified by the presenter may be transmitted in or with the particular electronic document. Alternatively, for stronger protection, the particular electronic document may be encrypted using the security code. File sharing application 142 may be configured to invoke operating system functionality or functionality provided by one or more other applications to add the security code to the particular electronic document or to encrypt the particular electronic document with the security code.

In step 330, the file sharing application of the participant processes the response received from the file sharing application of the presenter. For example, file sharing application 116 may process the response received from file sharing application 142. If the response indicates that the request was granted, file sharing application 116 retrieves and stores the particular electronic document, for example, on storage 122. File sharing application 116 also updates file sharing data 130 to indicate the current status of the request so that the requested documents screen 250 will indicate the current status of the participant's request for the particular electronic document. Any security restrictions applied to the particular electronic document by the presenter are subsequently enforced when the particular electronic document is accessed or processed. For example, security restrictions may be applied when an attempt is made to open the particular electronic document, and/or process the particular electronic document using applications, email, or at a printer multi-function peripheral (MFP), etc. Application of the security restrictions may require, for example, that a user enter a security code or be authenticated prior to accessing or processing the particular electronic document. For example, if Level 2 (Security Code) security restrictions were applied to the particular electronic document, the user may be required to enter the security code specified by the presenter to open the particular electronic document in an application program, such as a word processing program or a pdf viewer, or to print the particular electronic document at a printer or MFP.

C. Participant Authentication

It may be desirable in particular situations to provide additional security, for example, when a particular electronic document contains sensitive information. According to one embodiment, additional security is provided by a process referred to herein as "participant authentication" that conditions access to an electronic document on participation in an electronic meeting at which the electronic document was shared. Participant authentication requires that for a user to be granted access to an electronic document shared during an electronic meeting, the user must have both requested and been granted a copy of the electronic document in association with the electronic meeting, and been an actual participant of the electronic meeting in which the electronic document was shared. This prevents third parties from accessing an electronic document that was shared during an electronic meeting, even if the third party has a code or key to decrypt the electronic document.

Participant authentication may be implemented using a wide variety of techniques that may vary depending upon a particular implementation and that provide various levels of security. According to one embodiment, an entity, such as file sharing application 116, is configured to verify that a user requesting access to a particular electronic document that was shared during a particular electronic meeting was a participant (presenter and/or attendee) of the particular electronic meeting. Data may be stored, for example, in file sharing data 130, which specifies electronic documents that were shared during electronic meetings, along with the participants of those electronic meetings. The data may instead, or in addition to, be stored as part of an electronic document, e.g., in a header portion of an electronic document.

When the file sharing application 116 receives a request from a user to access the particular electronic document that was shared during a particular electronic meeting, file sharing application 116 verifies that the user was a participant (presenter and/or attendee) of the particular electronic meeting prior to granting access to the user of the particular electronic document. This may be implemented in addition to any encoding or encryption of the particular electronic document. Thus, in situations where an electronic document shared during an electronic meeting is also encoded or encrypted, once a determination has been made that the user is authorized to access the particular electronic document, then the user is prompted for a code or key to decrypt the particular electronic document. Participant authentication may also include the use of any type of user authentication.

FIG. 4A depicts example electronic meeting tracking data 400 that may be used by file sharing application 116 to determine whether a user requesting access to an electronic document was a participant in the electronic meeting at which the electronic document was shared. Electronic meeting tracking data 400 may be stored as part of file sharing data 130, or separately, and may be stored in any structure or format, depending upon a particular implementation. In the example depicted in FIG. 4A, electronic meeting tracking data 400 specifies, for each of a plurality of electronic meetings, electronic documents that were shared during the electronic meeting and participants who were present in the electronic meeting when the electronic documents were shared. For example, the first row of electronic meeting tracking data 400 indicates that during a meeting identified as "Meeting #1" a document named "Document A" was shared and that three meeting participants, identified as Participant A, Participant B and Participant C, were present during Meeting #1 when Document A was shared among the participants. Note that in Meeting #1, Participant C was no longer present in the electronic meeting when Document C was shared among the participants. Similarly, in Meeting #2, Participants A and D were present in the electronic meeting when Document D was shared among the participants and Participants A and E were present in the electronic meeting when Document E was shared among the participants. The tracking of participants during electronic meetings may be performed, for example, by collaboration client 114.

FIG. 4B is a flow diagram 450 that depicts an approach for using participant authentication to manage access to electronic documents shared during an electronic meeting. In step 452, a particular electronic document is shared during an electronic meeting. For purposes of this example, it is presumed that User A is a user of client device 102, is a participant of the electronic meeting and views the particular electronic document. It is further presumed that User A requests and is granted a copy of the particular electronic document, as previously described herein. The sharing of the particular electronic document during the electronic meeting may be tracked and documented by collaboration client 114. A copy of the particular electronic document is stored in requested file data 128 and electronic meeting tracking data 400 may be updated to specify that the particular electronic document was shared with User A during the electronic meeting. In this example, it is also presumed that the presenter who approved User A's request for the particular electronic document specified that security restrictions be applied to the particular electronic document and more specifically, that both participant authentication and encryption be applied to the particular electronic document.

In step 454, a participant requests access to the particular electronic document that was shared during the electronic meeting. For example, User A may request access to the particular electronic document by selecting one or more graphical user interface controls provided by file sharing application 116.

In step 456, file sharing application 116 performs participant authentication to verify whether the participant requesting access to the particular electronic document was a participant in the electronic meeting at which the particular electronic document was shared. For example, file sharing application 116 may consult electronic meeting tracking data 400 to verify whether User A was a participant in the electronic meeting at which the particular electronic document was shared.

Assuming that the participant authentication is successfully verified with respect to User A and the particular electronic document, then in step 458, file sharing application 116 queries the user for security information, based upon any security restrictions specified by the presenter. A wide variety of security approaches and/or security restrictions may be used with participant authentication. For example, according to one embodiment, electronic documents that are shared during electronic meetings are not encoded or encrypted, and access is controlled by file sharing application 116 verifying that a requestor was an actual participant of an electronic meeting at which a requested electronic document was shared. This approach may be considered to provide a relatively low level of security because once an electronic document is out of the control of file sharing application 116, the electronic document may be freely accessed by third parties. Alternatively, electronic documents that are shared during electronic meetings may be encoded or encrypted with data, such as a code or encryption key, specified by a presenter or automatically generated by the file sharing application of the presenter. This provides an additional level of security since an electronic document that is taken out of the control of file sharing application 116 is encoded or encrypted and can only be used by a third party if the third party knows the code or encryption key that was used to encrypt the electronic document.

For a higher level of security, an electronic document shared during an electronic meeting may be encoded or encrypted using data that is generated and/or supplied by the file sharing application of the presenter. The data may be a code or encryption key generated by the file sharing application of the presenter that is specific to the meeting at which the subject electronic document was shared. For example, data that is uniquely associated with the electronic meeting, such as a meeting identifier, may be used as an input to one or more hash functions to generate a unique key that is used to encrypt the electronic document. The key is unknown to the participant of the meeting (and third parties), so that if a third party obtains a copy of the encrypted electronic document, the third party will not be able to recover the original electronic document. The file sharing application of the presenter may generate a different code or encryption key for each electronic meeting and codes and encryption keys may also be specific to particular users and/or electronic documents shared during an electronic meeting.

For yet an even higher level of security, an electronic document shared during an electronic meeting may be encoded or encrypted using both 1) first data that is specified by the presenter; and 2) second data that is generated and/or supplied by the file sharing application of the presenter. The second data may be a code or encryption key generated by the file sharing application as previously described herein. The second data may be appended to the first data and used to encrypt the electronic document. As another example, the first data and the second data may be used as inputs to one or more hash functions to generate a key that is used to encrypt the electronic document. This approach provides the relatively highest level of security because a third party in possession of both the encrypted electronic document and the code or encryption key specified by the presenter is not able to decrypt the electronic document. Rather, in this situation, the electronic document can only be decrypted by a file sharing application after verifying that the requestor was a participant of the electronic meeting and after the requestor provides the first data specified by the presenter.

In step 460, file sharing application 116 verifies the security information, if applicable, and grants the requestor access to the particular electronic document. This may include decrypting an encrypted version of the electronic document to recover the original electronic document. The file sharing application 116 of the participant may obtain, from the file sharing application of the presenter, the data necessary to decrypt the encrypted electronic document. This may include, for example, the first data, the second data, or both the first data and the second data previously described herein.

In contrast to the foregoing, suppose that in step 254, User B, who was not a participant of the electronic meeting, requests access to the particular electronic document. In step 456, User B would not be successfully authenticated as a participant of the electronic meeting since User B was not a participant of the electronic meeting and therefore would not be granted access to the particular electronic document.

Granting of access to the electronic document may be provided in several ways that may vary depending upon a particular implementation. For example, file sharing application 116 may provide access to an unprotected version of the electronic document. As another example, file sharing application 116 may provide controlled access to the electronic document, e.g., via a viewer or other mechanism of file sharing application 116, without allowing a copy of the unprotected electronic document to be made.

IV. Private Electronic Meetings

Situations may arise where it is desirable for a subset of participants of an electronic meeting to share information that they do not want to be shared with all of the participants of the electronic meeting. This may occur in a wide variety of contexts. For example, suppose that a business meeting with four participants is being conducted electronically. Suppose further that two of the four participants wish to share information privately, for example so that they can decide on an issue being discussed in the electronic meeting. The information may include, for example, electronic documents, messages, conversation, etc., a videoconference, or any combination thereof. As another example, suppose that a job interview involving a candidate and two interviewers is being conducted electronically. Suppose further that during the interview, the interviewers wish to exchange information or discuss an issue privately, without the candidate, so that they can decide whether to extend an offer of employment to the candidate. In both of these examples, the participants wishing to exchange information and/or communicate privately typically have to conduct a separate meeting outside of the existing meeting, and then a follow-up meeting with the original participants, for example to discuss a decision that was made. This is inconvenient, requires more time and is inefficient. Embodiments previously described herein with respect to file sharing are applicable to private electronic meetings.

A. Overview

According to one embodiment, a capability is provided to establish one or more private electronic meetings to be conducted concurrent with an existing electronic meeting. Embodiments are described in the context of conducting a single private electronic meeting during an existing electronic meeting for purposes of explanation, but embodiments are not limited to this context and any number of private electronic meetings may be established during an existing electronic meeting. The use of private electronic meetings conducted concurrent with an existing electronic meeting provides many benefits, for example, allowing information to be shared privately and decisions to be made immediately, without having to conduct a separate meeting at a later time, which saves time and improves productivity.

A private electronic meeting, also referred to herein as a "huddle," is created during an existing electronic meeting and involves at least a subset of the participants of the existing electronic meeting. For example, suppose that an existing electronic meeting includes four participants. A private electronic meeting may be established that includes two or three of the four participants. A private electronic meeting may also include other participants that are not participants of the existing electronic meeting. For example, a private electronic meeting may include a subset of participants from an existing electronic meeting and one or more other participants who are not participants of the existing electronic meeting. This may be beneficial, for example, when the participants of the private electronic meeting wish to include another participant who is not part of the existing electronic meeting.

A private electronic meeting may include all of the information being shared during the existing electronic meeting, or a private electronic meeting may include less than all, or none, of the information shared during the existing electronic meeting. As used herein, the term "information" is used interchangeably with the term "content." Including less than all of the information may be desirable in a wide variety of contexts. For example, suppose that the private electronic meeting includes a particular participant who was not a participant of the existing electronic meeting. Suppose further that the participants of the private electronic meeting wish to share with the particular participant some of the information shared during the existing electronic meeting, but not all of the information shared during the existing electronic meeting. For example, the information shared during the existing electronic meeting may include sensitive information that should not be made available to the particular participant. The participants of the private electronic meeting may selectively select the information to be shared during the private electronic meeting and exclude the sensitive information.

A private electronic meeting may include additional information that was not included in the existing electronic meeting. For example additional information may be included in the private electronic meeting that is relevant to a particular participant of the private electronic meeting who was not a participant of the existing electronic meeting. According to one embodiment, controls are provided to prevent information selected for sharing during a private electronic meeting from being shared in the existing electronic meeting. This may be useful, for example, in situations where participants of a private electronic meeting share additional information that they do not wish to be shared with all of the participants of the existing electronic meeting. The controls may prevent the accidental sharing of information.

According to one embodiment, when a new private electronic meeting is established, data is generated and stored that indicates an association with a general electronic meeting from which the new private electronic meeting was established. For example, collaboration client 114 may generate and store data, either locally or in conjunction with collaboration server 106, that indicates that a particular new private electronic meeting was instantiated from a particular general electronic meeting.

B. Establishing Private Electronic Meetings

Figure 5A:
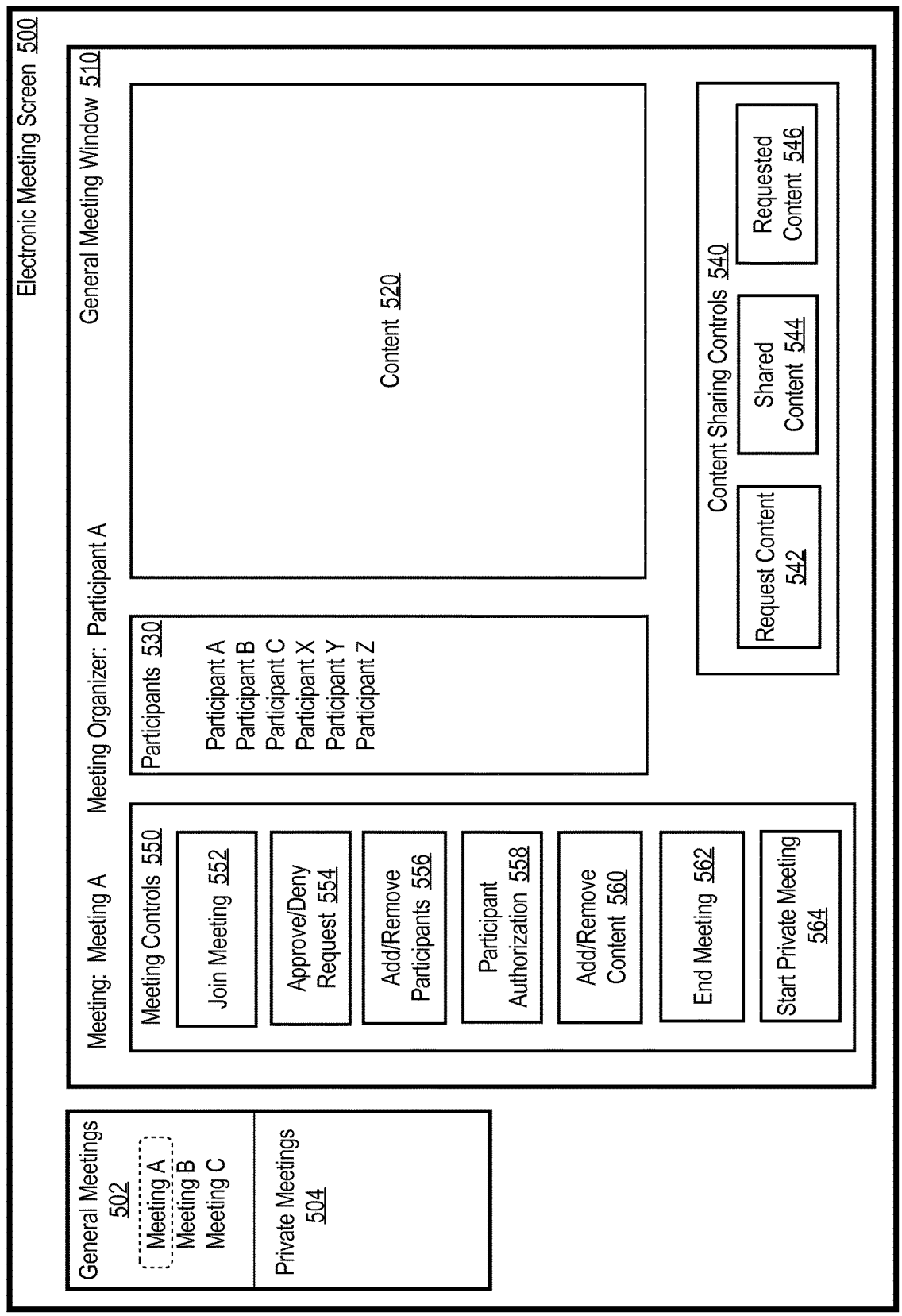
FIG. 5A depicts an example electronic meeting screen generated by collaboration client.

FIG. 5A depicts an example electronic meeting screen 500 generated by collaboration client 114. Electronic meeting screen 500 indicates general meetings 502 and private meetings 504 that are currently in progress. A user may select any of the general meetings 502 or private meetings 504, subject to applicable authorization criteria discussed in more detail hereinafter, and the selected meeting is displayed on electronic meeting screen 500. In the example depicted in FIG. 5A, one of the general meetings 502 referred to as Meeting A has been selected by a user and Meeting A is displayed in a general meeting window 510. In this example, Participant A created the general electronic meeting and is therefore the meeting organizer of the general electronic meeting.

General meeting window 510 includes content 520, participants 530, content sharing controls 540 and meeting controls 550. The participants 530 includes data that specifies the current participants of the meeting. The content sharing controls 540 include a request content 542, a shared content 544 and a requested content 546 control, which correspond to the document sharing controls 220 previously described herein.

The meeting controls 550 include controls to join meeting 552, approve/deny request 554, add/remove participants 556, participant authorization 558, add/remove content 560, end meeting 562 and start private meeting 564. Meeting controls 550 may be selectively made available to users, depending upon a particular implementation. For example, the approve/deny request 554, add/remove participants 556, participant authorization 558 and end meeting 562 controls may be visible to all participants of a meeting, but may be selectable only by the meeting organizer of the meeting, or by designees of the meeting organizer. For purposes of explanation, all of the meeting controls 550 are depicted in the figures.

The join meeting 552 control allows a user to request to join the currently-selected meeting. According to one embodiment, selecting the join meeting 552 control causes the collaboration client 114 on the user's client device 102 to generate and send to the collaboration client of the meeting organizer, a request for the user to join the currently-selected meeting. The request includes data that specifies the currently-selected meeting and data that identifies the user. The request may be processed and immediately denied, for example, if the user is not authorized to join the meeting. Alternatively, the meeting organizer may be notified of the user's request to join the currently-selected meeting and then approve or deny the request using the approve/deny request 554 control. The add/remove participants 556 control allows a user, such as the meeting organizer, to add or remove participants to or from a meeting. In response to a user selection of the add/remove participants 556 control, the user, such as a meeting organizer, a list of contacts may be presented as candidate participants of the meeting that the meeting organizer may select for invitation to the meeting. The participant authorization 558 control allows a user, such as a meeting organizer, to specify attributes of users who are permitted to attend a particular meeting. For example, a meeting organizer may specify that a user must be at a particular organizational level (or higher) or be a member of a particular group, project or class, to participate in a meeting.

The add/remove content 560 control allows a user to add or remove content to or from a meeting. According to one embodiment, any participant of an electronic meeting may add or remove content from an electronic meeting. Alternatively, restrictions may be placed on who can add or remove content from an electronic meeting. For example, a meeting organizer may specify which participants are authorized to add or remove content from an electronic meeting. This may be done directly by specifying particular participants, or may be done by specifying attributes, such as a level within a business organization or a security level, that a user must have to be authorized to add or remove content from an electronic meeting. Selection of the add/remove content 560 control may cause one or more graphical user interface objects to be displayed that allow a user to add or remove content to an electronic meeting. For example, a list may be provided that specifies content items currently included in an electronic meeting, along with controls for removing one or more of the content items. Controls may be provided that allow a user to locate and select content to be added to an electronic meeting. This may include, for example, the capability to add content to an electronic meeting using drag and drop controls. According to one embodiment, a capability is provided that allows a meeting organizer to approve all requests to add content to an electronic meeting.

The end meeting 562 control allows a user, such as the meeting organizer, to end a meeting. According to one embodiment, only the meeting organizer or a user designated by the meeting organizer is authorized to end an electronic meeting. Alternatively, any participant of an electronic meeting may end an electronic meeting via the end meeting 562 control. Selection of the end meeting 562 control may cause the collaboration client 114 on the user's client device 102 to generate and transmit a request to terminate the electronic meeting to collaboration server 106 and/or the collaboration clients on the devices of the participants of the meeting.

The start private meeting 564 control allows a user to start a new private meeting. User selection of the start private meeting 564 control causes a new private electronic meeting to be established and conducted concurrently with the general meeting currently in progress. The user requesting creation of the new private electronic meeting may be any user, for example a participant of the current general electronic meeting, or another user, such as administrative support personnel. The user requesting to start a private electronic meeting may be designated by default as the meeting organizer of the new private electronic meeting, but this is not required, and the user requesting to start a private electronic meeting may designate a meeting organizer for the new private electronic meeting. The user requesting to start a private electronic meeting is not required to be a participant of either the current general electronic meeting or of the new private electronic meeting. In response to detecting a user selection of the start private meeting 564 control, collaboration client 114 interacts with collaboration manager 150 and/or collaboration clients on other devices to instantiate the new private electronic meeting, which may include, for example, initiating a new video conferencing session.

Figure 5B:
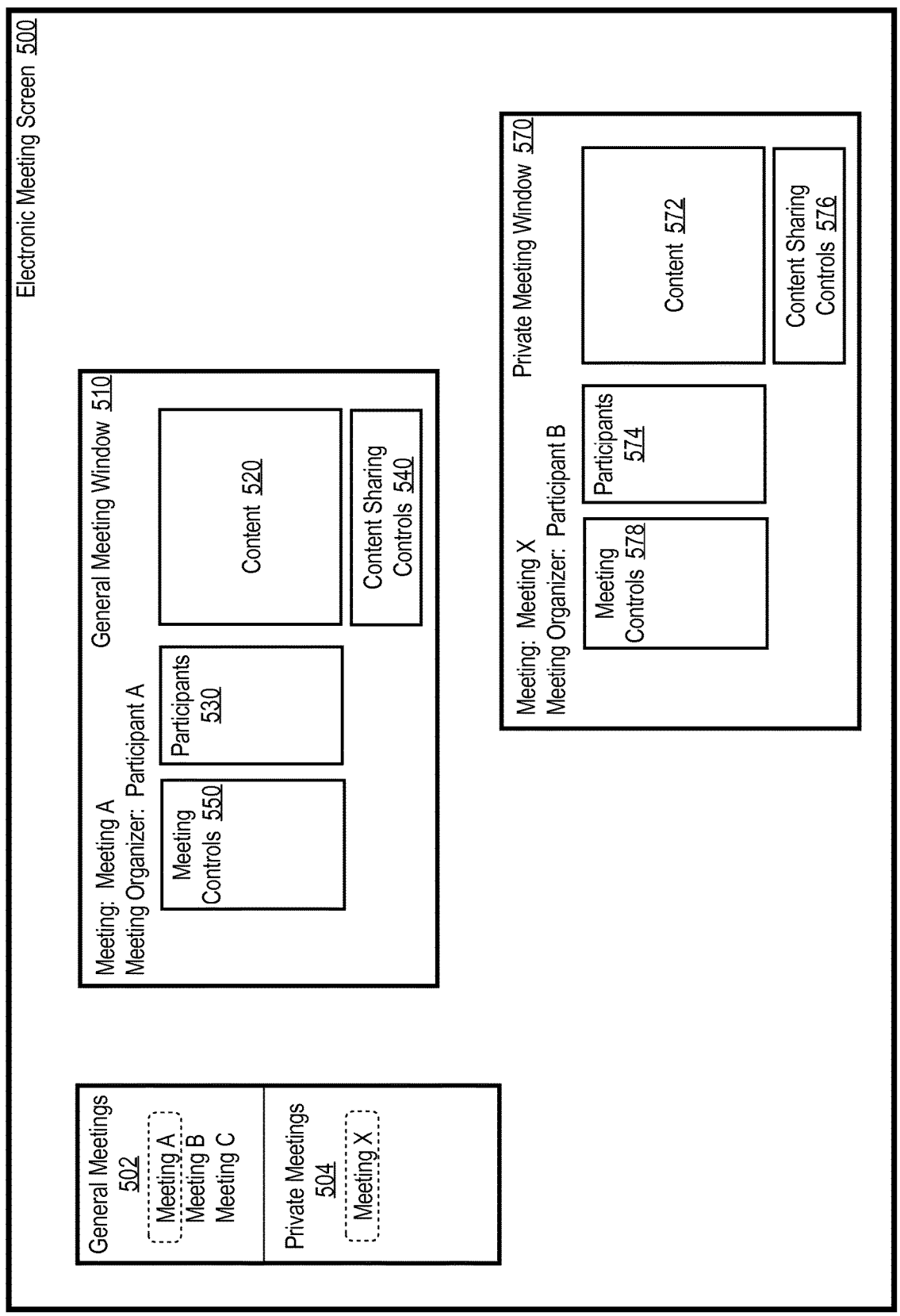
FIG. 5B depicts an electronic meeting screen with a general meeting window and a private meeting window for a new private electronic meeting that has been instantiated.

FIG. 5B depicts electronic meeting screen 500 with the general meeting window 510 of FIG. 5A, and a private meeting window 570 for the new private electronic meeting that has been instantiated. In this example, Participant B of the general electronic meeting created the new private electronic meeting, depicted in the figures as "Meeting X," and is also the meeting organizer of the private electronic meeting. Private meeting window 570 may be presented as a separate window from general meeting window 510, as depicted in FIG. 5B, or private meeting window 570 may be created within general meeting window 510, depending upon a particular implementation. One or more additional private electronic meetings may be established and the corresponding private electronic meeting windows created in general meeting window 510 and/or private meeting window 570.

The general meetings 502 control and the private meetings 504 control allow a user to select and de-select the particular electronic meetings to be viewed on electronic meeting screen 500. The meeting windows displayed on electronic meeting screen 500 may be displayed in a manner to visually distinguish them from each other. For example, display attributes, such as color, style and special effects, may be selectively applied to visually distinguish the meeting windows. All meeting windows displayed on electronic meeting window 500 may be active, meaning that the content in each of the windows may be updated at the same time. In situations where client device 102 has only a single camera and microphone and multiple meeting windows include videoconferencing sessions, then a user may select a single meeting window to be the active window with respect to the camera and microphone. According to one embodiment, the general meetings 502 control and the private meetings 504 control are populated on a user-specific basis, meaning that the meetings listed in the general meetings 502 control and the private meetings 504 control are the meetings that the user is a participant of, or otherwise is authorized to view. For example, a particular user may not be able to see that certain general or private meetings are in progress if the particular user does not have sufficient privileges for those electronic meetings. Thus, participants of a general electronic meeting may not be given authorization to view or participate in a private electronic meeting that was instantiated during the general electronic meeting. Similarly, one or more participants of the private electronic meeting may not be given authorization to view or participate in the general electronic meeting from which the private electronic meeting was instantiated.

Figure 5C:
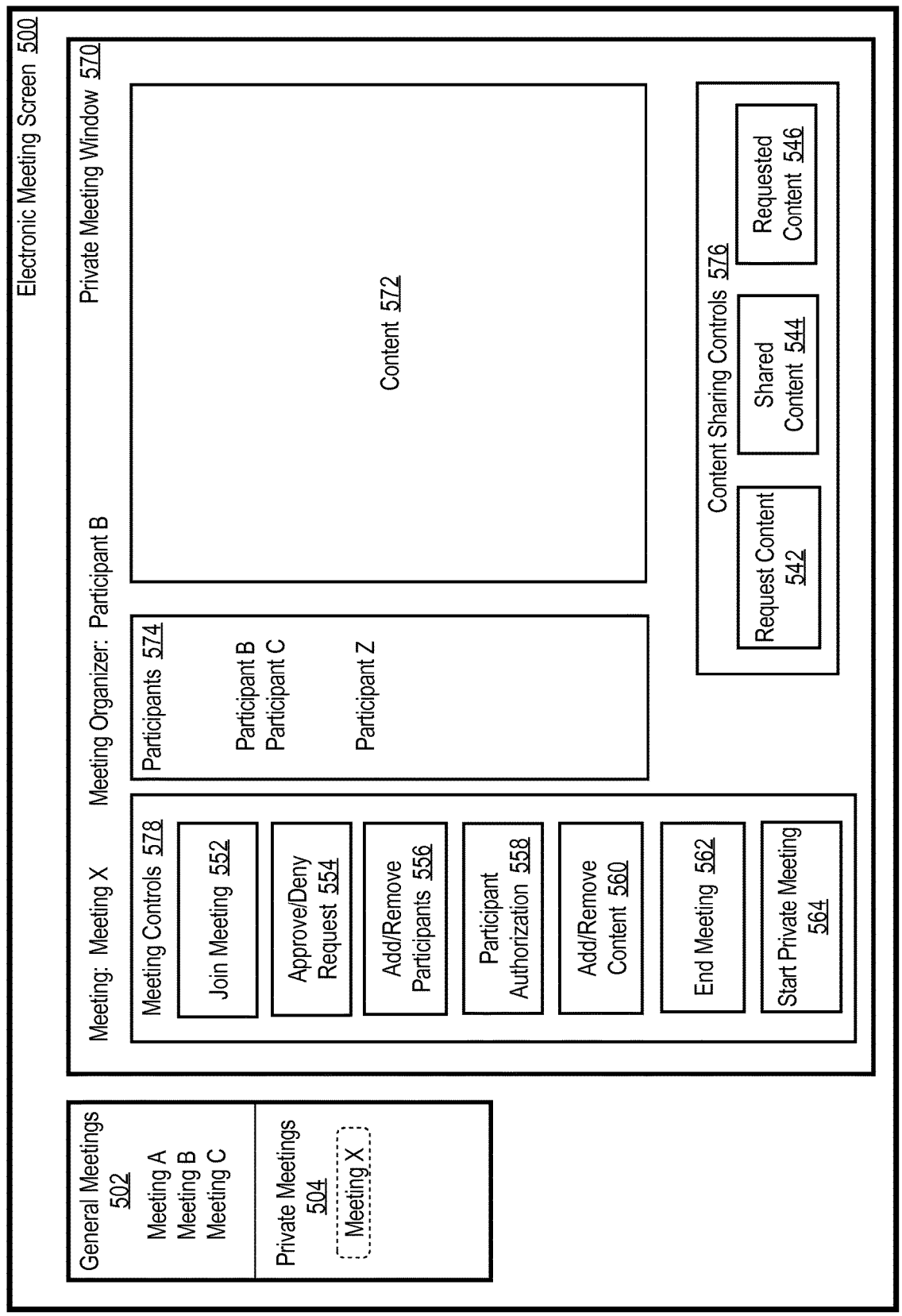
FIG. 5C depicts a private meeting window.

Private meeting window 570 includes content 572, participants 574, document sharing controls 576 and meeting controls 578. Private meeting window 570 may include fewer or additional controls that may vary, depending upon a particular implementation. FIG. 5C depicts private meeting window 570 in more detail. General meeting window 510 is intentionally not included in FIG. 5C for purposes of better depicting the details of private meeting window 570. In the example depicted in FIG. 5C, meeting controls 578 include a start private meeting 564 control to allow any number of additional private electronic meetings to be established from the private meeting window 570.

C. Private Electronic Meeting Participants

The participants of a private electronic meeting may be the same or different than the participants of a general electronic meeting and other private electronic meetings. In practice it may be common for a private electronic meeting to include fewer than all of the participants of the general electronic meeting from which the private electronic meeting was instantiated, but this is not required. For example, a general meeting may include some participants that are not needed for a private meeting to discuss a specific issues. Furthermore, a private electronic meeting may include participants that are not participants of the general electronic meeting.

According to one embodiment, either the user creating the new private electronic meeting or the meeting organizer designated for the new private electronic meeting selects the participants of a new private electronic meeting. Selection of participants for a private electronic meeting may be done via the add/remove participants 556 control. For example, in response to selecting the add/remove participants 556 control, a user may be presented with a list of candidate participants. The candidate participants may be derived from the user's personal contacts and/or contacts associated with a business organization or a group. According to one embodiment, the participants of a general electronic meeting are automatically designated as candidate participants of a private electronic meeting. The user may then select candidate participants to be invited to the private electronic meeting. In response, collaboration client 114 causes a meeting invitation to be sent to the collaboration client of each of the candidate participants, who may individually accept or decline the invitation. Collaboration client 114 may interact with programs and applications, for example calendaring programs, to cause the meeting invitations to be generated.

A user may use the participant authorization 558 control to specify attributes of participants that are allowed to attend the new private electronic meeting. The specified attributes may be used to filter the candidate participants that are presented to a user. For example, the user requesting to start a new private electronic meeting, by selecting start private meeting 564 control from meeting controls 550, may also select the participant authorization 558 control and specify that participants of the new private electronic meeting must be at a specified level or higher within a business organization, be a member of a specified group or project, or have at least a specified security clearance level. In this example, the candidate participants for the new private electronic meeting that are presented to the user will satisfy the specified criteria, namely, be at the specified level or higher within the business organization, be a member of a specified group or project, or have at least a specified security clearance level. Single attributes or multiple attributes may be specified, depending upon a particular implementation. For example, a user may specify that participants of a particular private electronic meeting must be a member of a particular project within a business organization and be at a specified level or higher within the business organization. According to one embodiment, the graphical user interface generated and managed by collaboration client 114 supports selecting participants 574 for a private electronic meeting using drag and drop controls, e.g., via a pointing device such as a mouse or trackball. For example, a user may drag and drop the name of a particular candidate participant from a list of candidate participants, or from participants 530 of general meeting window 510, onto a graphical user interface object associated with a new private electronic meeting, such as private meeting window 570, to cause the particular candidate participant to be invited to the new private electronic meeting.

D. Adding Content to Private Electronic Meetings

The information or content shared via a private electronic meeting may include may type of information or content. Examples of information and content that may be shared during a private electronic meeting include, without limitation, electronic documents, text, images, audio/video content, etc., or any combination thereof. Private electronic meetings may support messaging and chat sessions, video-conferencing and desktop sharing. Content may be added to a private electronic meeting using a wide variety of methods that may vary depending upon a particular implementation, for example, using the add/remove content 560 control previously described herein.

Restrictions may be placed on which participants may add and/or remove content from a private electronic meeting. For example, when a new private electronic meeting is established, the meeting organizer may specify which participants are authorized to add and/or remove content from the new private electronic meeting. This effectively allows a meeting organizer to characterize some participants as having "read only" access and other participants as having "read/write" access, with respect to content shared during the private electronic meeting. Collaboration client 114 may provide one or more graphical user interface controls for specifying which participants are authorized to add and/or delete content from a private electronic meeting. Furthermore, additional granularity may be provided by allowing a meeting organizer to specify the attributes of content that particular participants may add to or delete from a private electronic meeting. For example, some participants may be given authority to add and/or delete any type of content from a private electronic meeting, while other participants may be given authority to add and/or delete content having particular attributes, e.g., certain types of content.

According to one embodiment, content shared during a private electronic meeting may be designated as information that is not to be shared in other electronic meetings, including a general meeting from which the private electronic meeting was instantiated. Referring to FIG. 5B, any portion or all of content 572 that is shared during private electronic meeting X may be designated as not to be shared during general electronic meeting A. This may be useful, for example, in situations where the participants of a private electronic meeting wish to share information amongst themselves that they do not wish to share with one or more participants of a general electronic meeting. To avoid accidental sharing of information in this situation, the graphical user interface controls that allow a user to designate information to be shared during a private electronic meeting may include a control to "lock" one or more portions of the information. Information designated as "locked" may be shared during a private electronic meeting, but not during a general electronic meeting from which the private electronic meeting was instantiated.

FIG. 6 is a flow diagram 600 that depicts an approach for sharing information using private meetings. In step 602, a general electronic meeting is established. For example, a user of client device 102 may use collaboration client 114 to establish a general electronic meeting with a plurality of participants. Collaboration client 114 instantiates the general electronic meeting and creates a general meeting window 510 on electronic meeting screen 500.

In step 604, a user requests to start a private electronic meeting. For example, a participant of the general electronic meeting, which may be the meeting organizer or another participant, request to start a private electronic meeting by selecting the start private meeting 564 control (FIG. 5A). In response to this selection, the user's collaboration client 114 instantiates a private electronic meeting and generates a private meeting window 570 that includes meeting controls 578 as previously described herein. In step 606, participants are selected and/or invited for the private electronic meeting. Participants of the general electronic meeting may be selected as candidate participants from which participants are selected by the meeting organizer. The meeting organizer may also select candidates from other sources, such as a contact list of a business organization or group, personal contact list, etc. Once the participants for the private electronic meeting are selected, an invitation is sent to each of the participants, who may accept or decline the invitation.

In step 608, content is selected for the private electronic meeting. Participants who are authorized to add content to the private electronic meeting may use the add/remove content 560 control to add content to the private electronic meeting. This may include a participant using navigation controls, drag and drop, etc., to add content to private meeting window 570.

In step 610, the new private electronic meeting starts.

V. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
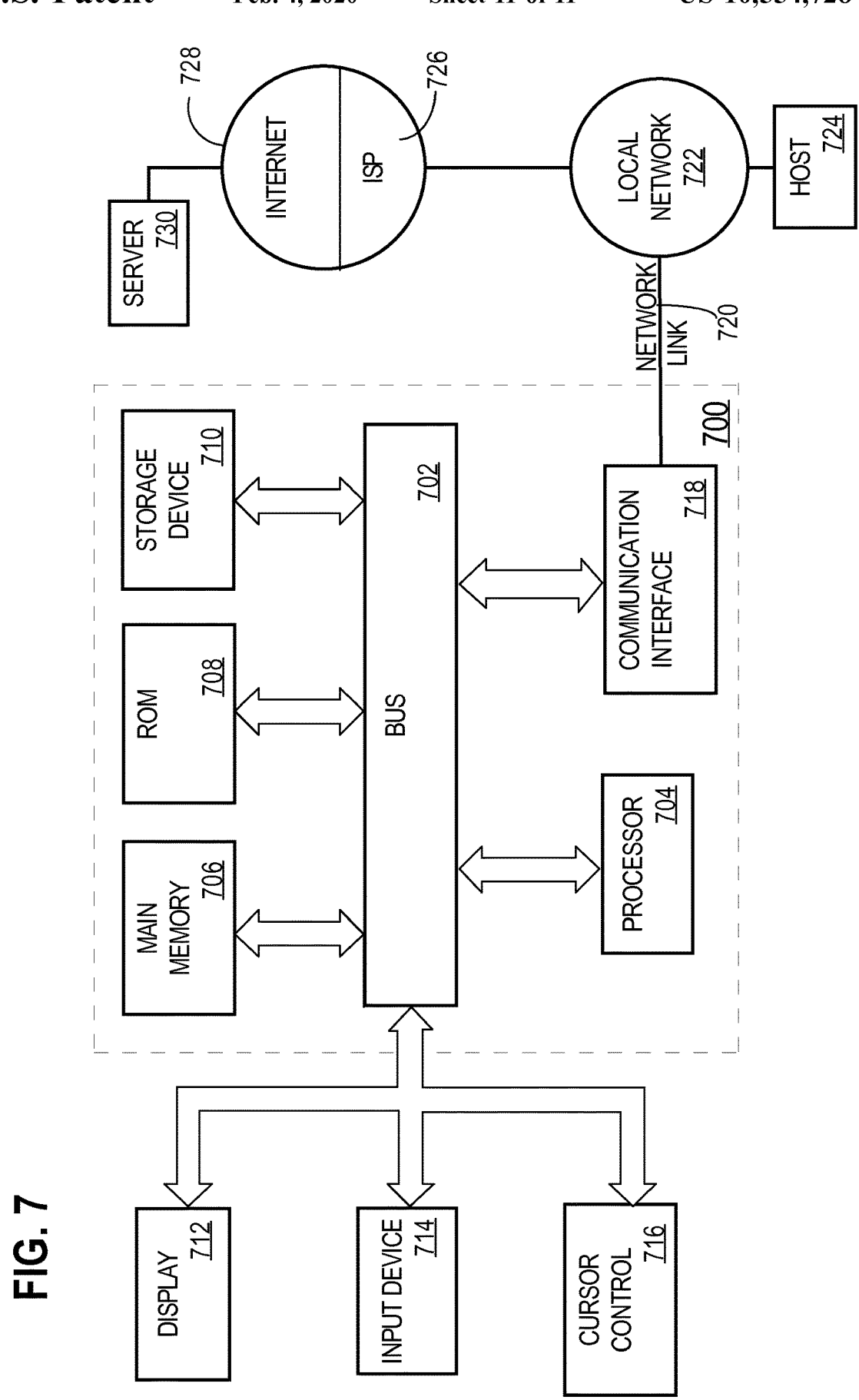
FIG. 7 is a block diagram that depicts an example computer system upon which embodiments may be implemented.

FIG. 7 is a block diagram that depicts an example computer system 700 upon which embodiments may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. Although bus 702 is illustrated as a single bus, bus 702 may comprise one or more buses. For example, bus 702 may include without limitation a control bus by which processor 704 controls other devices within computer system 700, an address bus by which processor 704 specifies memory locations of instructions for execution, or any other type of bus for transferring data or signals between components of computer system 700.

An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic or computer software which, in combination with the computer system, causes or programs computer system 700 to be a special-purpose machine. According to one embodiment, those techniques are performed by computer system 700 in response to processor 704 processing instructions stored in main memory 706. Such instructions may be read into main memory 706 from another computer-readable medium, such as storage device 710. Processing of the instructions contained in main memory 706 by processor 704 causes performance of the functionality described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 700, various computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of computer-readable media may be involved in storing instructions for processing by processor 704. For example, the instructions may initially be stored on a storage medium of a remote computer and transmitted to computer system 700 via one or more communications links. Bus 702 carries the data to main memory 706, from which processor 704 retrieves and processes the instructions. The instructions received by main memory 706 may optionally be stored on storage device 710 either before or after processing by processor 704.

Computer system 700 also includes a communication interface 718 coupled to bus 702. Communication interface 718 provides a communications coupling to a network link 720 that is connected to a local network 722. For example, communication interface 718 may be a modem to provide a data communication connection to a telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be processed by processor 704 as it is received, and/or stored in storage device 710, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus providing an improvement in electronic meetings conducted over computer networks, the apparatus comprising:
   one or more processors;
   one or more memories communicatively coupled to the one or more processors;
   a collaboration client executing on the apparatus and configured to support an electronic meeting via one or more networks with another apparatus that is external to the apparatus and to:
      cause to be displayed on a display, one or more graphical user interface objects that allow a user of the apparatus to request creation of a private electronic meeting to be conducted concurrently with an existing electronic meeting, wherein the private electronic meeting includes participants from the existing electronic meeting and allows for the sharing of information between participants,
      detect a user selection of the one or more graphical user interface objects that allow a user of the apparatus to request creation of a private electronic meeting to be conducted concurrently with an existing electronic meeting, wherein the private electronic meeting includes participants from the existing electronic meeting and allows for the sharing of information between participants, and
      in response to detection of the user selection of the one or more graphical user interface objects that allow a user of the apparatus to request creation of a private electronic meeting to be conducted concurrently with an existing electronic meeting, wherein the private electronic meeting includes participants from the existing electronic meeting and allows for the sharing of information between participants:
         cause creation of the private electronic meeting to be conducted concurrently with the existing electronic meeting,
         cause to be displayed on the display, an add/remove participants control that allows a user to add participants to the private electronic meeting and one or more graphical user interface objects that allow the user of the apparatus to specify one or more required attributes of participants to be able to participate in the private electronic meeting,
         detect a user selection of the add/remove participants control and at least one graphical user interface object from the one or more graphical user interface objects that specify one or more required attributes of participants to be able to participate in the private electronic meeting,
         in response to detecting the user selection of the add/remove participants control and the at least one graphical user interface object from the one or more graphical user interface objects that specify one or more required attributes of participants to be able to participate in the private electronic meeting:
            determine a subset of participants from the plurality of participants of the existing electronic meeting that satisfy the one or more required attributes of participants to be able to participate in the private electronic meeting that correspond to the selected at least one graphical user interface object, and
            display the subset of participants from the plurality of participants of the existing electronic meeting as user-selectable candidate participants for the private electronic meeting on the display,
         detect a user selection of one or more candidate participants, from the plurality of candidate participants, for the private electronic meeting,
         in response to detecting the user selection of one or more candidate participants, from the plurality of candidate participants for the private electronic meeting, adding the one or more candidate participants to the private electronic meeting.

2. The apparatus of claim 1, wherein:
   the private electronic meeting includes a particular participant that is not included in the plurality of participants of the existing electronic meeting, and
   the collaboration client is further configured to cause to be displayed on the display, one or more graphical user interface objects that allow the user of the apparatus to specify, for inclusion in the private electronic meeting, the particular participant that is not included in the plurality of participants of the existing electronic meeting.

3. The apparatus of claim 1, wherein the one or more required attributes of participants to be able to participate in the private electronic meeting include one or more of a level within a business organization, a member of a group or project, or a security clearance level.

4. The apparatus of claim 1, wherein the collaboration client is further configured to cause to be displayed on the display, one or more graphical user interface objects that allow the user of the apparatus to specify one or more permissions for a particular participant of the private electronic meeting, wherein the one or more permissions specify whether the particular participant is authorized to add or delete content to and from the private electronic meeting.

5. The apparatus of claim 4, wherein:
   wherein the one or more permissions further specify attributes of content that the particular participant is authorized to add or delete to and from the private electronic meeting.

6. The apparatus of claim 1, wherein:
the existing electronic meeting provides for the sharing of a plurality of information among the plurality of participants of the existing electronic meeting, and
the collaboration client is further configured to cause to be displayed on the display, one or more graphical user interface objects that allow the user of the apparatus to specify particular information, not included in the plurality of information shared among the plurality of participants of the electronic meeting, to be included in the private electronic meeting and prevented from being included in the existing electronic meeting.

7. The apparatus of claim 1, wherein both the existing electronic meeting and the private electronic meeting are implemented as video conferencing sessions and the information includes one or more of one or more electronic documents, audio/visual content or one or more messages.

8. The apparatus of claim 1, wherein the collaboration client is further configured to cause to be displayed, on the display, a graphical user interface that supports display of the private electronic meeting concurrently with the existing electronic meeting.

9. One or more non-transitory computer-readable media providing an improvement in electronic meetings conducted over computer networks, the apparatus, the one or more non-transitory computer-readable media storing instructions which, when processed by one or more processors, cause a collaboration client executing on an apparatus, and configured to support an electronic meeting via one or more networks with another apparatus that is external to the apparatus, to:
cause to be displayed on a display, one or more graphical user interface objects that allow a user of the apparatus to request creation of a private electronic meeting to be conducted concurrently with an existing electronic meeting, wherein the private electronic meeting includes participants from the existing electronic meeting and allows for the sharing of information between participants,
detect a user selection of the one or more graphical user interface objects that allow a user of the apparatus to request creation of a private electronic meeting to be conducted concurrently with an existing electronic meeting, wherein the private electronic meeting includes participants from the existing electronic meeting and allows for the sharing of information between participants, and
in response to detection of the user selection of the one or more graphical user interface objects that allow a user of the apparatus to request creation of a private electronic meeting to be conducted concurrently with an existing electronic meeting, wherein the private electronic meeting includes participants from the existing electronic meeting and allows for the sharing of information between participants:
cause creation of the private electronic meeting to be conducted concurrently with the existing electronic meeting,
cause to be displayed on the display, an add/remove participants control that allows a user to add participants to the private electronic meeting and one or more graphical user interface objects that allow the user of the apparatus to specify one or more required attributes of participants to be able to participate in the private electronic meeting,
detect a user selection of the add/remove participants control and at least one graphical user interface object from the one or more graphical user interface objects that specify one or more required attributes of participants to be able to participate in the private electronic meeting,
in response to detecting the user selection of the add/remove participants control and the at least one graphical user interface object from the one or more graphical user interface objects that specify one or more required attributes of participants to be able to participate in the private electronic meeting:
determine a subset of participants from the plurality of participants of the existing electronic meeting that satisfy the one or more required attributes of participants to be able to participate in the private electronic meeting that correspond to the selected at least one graphical user interface object, and
display the subset of participants from the plurality of participants of the existing electronic meeting as user-selectable candidate participants for the private electronic meeting on the display,
detect a user selection of one or more candidate participants, from the plurality of candidate participants, for the private electronic meeting,
in response to detecting the user selection of one or more candidate participants, from the plurality of candidate participants for the private electronic meeting, adding the one or more candidate participants to the private electronic meeting.

10. The one or more non-transitory computer-readable media of claim 9, wherein:
the private electronic meeting includes a particular participant that is not included in the plurality of participants of the existing electronic meeting, and
the one or more non-transitory computer-readable media store additional instructions which, when processed by one or more processors, cause the collaboration client to cause to be displayed on the display, one or more graphical user interface objects that allow the user of the apparatus to specify, for inclusion in the private electronic meeting, the particular participant that is not included in the plurality of participants of the existing electronic meeting.

11. The one or more non-transitory computer-readable media of claim 9, wherein the one or more required attributes of participants to be able to participate in the private electronic meeting include one or more of a level within a business organization, a member of a group or project, or a security clearance level.

12. The one or more non-transitory computer-readable media of claim 9, further comprising additional instructions which, when processed by one or more processors, cause the collaboration client to cause to be displayed on the display, one or more graphical user interface objects that allow the user of the apparatus to specify one or more permissions for a particular participant of the private electronic meeting, wherein the one or more permissions specify whether the particular participant is authorized to add or delete content to and from the private electronic meeting.

13. The one or more non-transitory computer-readable media of claim 9, wherein:
wherein the one or more permissions further specify attributes of content that the particular participant is authorized to add or delete to and from the private electronic meeting.

14. The one or more non-transitory computer-readable media of claim 9, wherein:
the existing electronic meeting provides for the sharing of a plurality of information among the plurality of participants of the existing electronic meeting, and
the one or more non-transitory computer-readable media store additional instructions which, when processed by one or more processors, cause the collaboration client to cause to be displayed on the display, one or more graphical user interface objects that allow the user of the apparatus to specify particular information, not included in the plurality of information shared among the plurality of participants of the electronic meeting, to be included in the private electronic meeting and prevented from being included in the existing electronic meeting.

15. The one or more non-transitory computer-readable media of claim 9, wherein both the existing electronic meeting and the private electronic meeting are implemented as video conferencing sessions and the information includes one or more of one or more electronic documents, audio/visual content or one or more messages.

16. The one or more non-transitory computer-readable media of claim 9, wherein the collaboration client is further configured to cause to be displayed, on the display, a graphical user interface that supports display of the private electronic meeting concurrently with the existing electronic meeting.

17. A computer-implemented method providing an improvement in electronic meetings conducted over computer networks, the apparatus, the computer-implemented method comprising:
   causing, by a collaboration client executing on an apparatus and configured to support an electronic meeting via one or more networks with another apparatus that is external to the apparatus, to be displayed on a display, one or more graphical user interface objects that allow a user of the apparatus to request creation of a private electronic meeting to be conducted concurrently with an existing electronic meeting, wherein the private electronic meeting includes participants from the existing electronic meeting and allows for the sharing of information between participants,
   detecting, by the collaboration client executing on the apparatus, a user selection of the one or more graphical user interface objects that allow a user of the apparatus to request creation of a private electronic meeting to be conducted concurrently with an existing electronic meeting, wherein the private electronic meeting includes participants from the existing electronic meeting and allows for the sharing of information between participants, and
   in response to detection of the user selection of the one or more graphical user interface objects that allow a user of the apparatus to request creation of a private electronic meeting to be conducted concurrently with an existing electronic meeting, wherein the private electronic meeting includes a subset of participants from a plurality of participants of the existing electronic meeting and allows for the sharing of information between participants in the subset of participants from the plurality of participants of the existing electronic meeting:
      cause, by the collaboration client executing on the apparatus, creation of the private electronic meeting to be conducted concurrently with the existing electronic meeting,
      cause to be displayed on the display, an add/remove participants control that allows a user to add participants to the private electronic meeting and one or more graphical user interface objects that allow the user of the apparatus to specify one or more required attributes of participants to be able to participate in the private electronic meeting,
      detect a user selection of the add/remove participants control and at least one graphical user interface object from the one or more graphical user interface objects that specify one or more required attributes of participants to be able to participate in the private electronic meeting,
      in response to detecting the user selection of the add/remove participants control and the at least one graphical user interface object from the one or more graphical user interface objects that specify one or more required attributes of participants to be able to participate in the private electronic meeting:
         determine a subset of participants from the plurality of participants of the existing electronic meeting that satisfy the one or more required attributes of participants to be able to participate in the private electronic meeting that correspond to the selected at least one graphical user interface object, and
         display the subset of participants from the plurality of participants of the existing electronic meeting as user-selectable candidate participants for the private electronic meeting on the display,
      detect a user selection of one or more candidate participants, from the plurality of candidate participants, for the private electronic meeting,
      in response to detecting the user selection of one or more candidate participants, from the plurality of candidate participants for the private electronic meeting, adding the one or more candidate participants to the private electronic meeting.

18. The computer-implemented method of claim 17, wherein the private electronic meeting includes a particular participant that is not included in the plurality of participants of the existing electronic meeting, and the collaboration client causes to be displayed on the display, one or more graphical user interface objects that allow the user of the apparatus to specify, for inclusion in the private electronic meeting, the particular participant that is not included in the plurality of participants of the existing electronic meeting.

19. The computer-implemented method of claim 17, wherein the collaboration client is further configured to cause to be displayed on the display, one or more graphical user interface objects that allow the user of the apparatus to specify one or more permissions for a particular participant of the private electronic meeting, wherein the one or more permissions specify whether the particular participant is authorized to add or delete content to and from the private electronic meeting.

20. The computer-implemented method of claim 19, wherein:
   wherein the one or more permissions further specify attributes of content that the particular participant is authorized to add or delete to and from the private electronic meeting.

* * * * *